(12) United States Patent
Momchilov et al.

(10) Patent No.: US 8,866,701 B2
(45) Date of Patent: Oct. 21, 2014

(54) TRANSPARENT USER INTERFACE INTEGRATION BETWEEN LOCAL AND REMOTE COMPUTING ENVIRONMENTS

(75) Inventors: Georgy Momchilov, Coconut Creek, FL (US); Abraham Mir, Pembroke Pines, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 137 days.

(21) Appl. No.: 13/410,659

(22) Filed: Mar. 2, 2012

(65) Prior Publication Data

US 2012/0226742 A1 Sep. 6, 2012

Related U.S. Application Data

(60) Provisional application No. 61/448,716, filed on Mar. 3, 2011.

(51) Int. Cl.
| | | |
|---|---|---|
| *G09G 5/00* | (2006.01) | |
| *G06F 15/16* | (2006.01) | |
| *G06F 3/0481* | (2013.01) | |
| *G06F 3/14* | (2006.01) | |

(52) U.S. Cl.
CPC .......... *G06F 3/0481* (2013.01); *G09G 2354/00* (2013.01); *G06F 3/1454* (2013.01)
USPC .............. 345/2.2; 345/2.1; 345/1.1; 709/219; 709/203

(58) Field of Classification Search
USPC ......... 709/219, 247, 203, 201, 205, 217, 218, 709/229; 345/158, 73, 2.2, 2.1, 1.1; 705/14.1
See application file for complete search history.

(56) References Cited

U.S. PATENT DOCUMENTS

| | | | |
|---|---|---|---|
| 7,433,962 B2 | 10/2008 | Janssen et al. | |
| 7,565,652 B2 | 7/2009 | Janssen et al. | |
| 7,725,527 B2 | 5/2010 | Janssen et al. | |
| 7,890,570 B2 | 2/2011 | Mazzaferri | |
| 2003/0163510 A1 | 8/2003 | Janssen | |
| 2003/0172196 A1* | 9/2003 | Hejlsberg et al. | 709/328 |
| 2003/0187955 A1* | 10/2003 | Koch | 709/219 |
| 2003/0218597 A1* | 11/2003 | Hodzic et al. | 345/158 |
| 2004/0010622 A1* | 1/2004 | O'Neill et al. | 709/247 |
| 2004/0183756 A1* | 9/2004 | Freitas et al. | 345/73 |
| 2007/0055841 A1 | 3/2007 | Jansen et al. | |
| 2009/0254982 A1 | 10/2009 | Jansen et al. | |
| 2010/0299187 A1* | 11/2010 | Duggal | 705/14.1 |
| 2011/0067027 A1 | 3/2011 | Jansen et al. | |
| 2011/0153853 A1* | 6/2011 | London et al. | 709/229 |
| 2011/0271226 A1 | 11/2011 | Janssen et al. | |
| 2012/0005269 A1 | 1/2012 | Janssen et al. | |
| 2012/0226742 A1* | 9/2012 | Momchilov et al. | 709/203 |

* cited by examiner

*Primary Examiner* — Le H Luu
(74) *Attorney, Agent, or Firm* — Banner & Witcoff, Ltd.

(57) ABSTRACT

Methods and systems for transparent user interface integration between remote ("published") applications and their local counterparts are described, providing a seamless, unified user experience, and allowing integration of a start menu, dock, taskbar, desktop shortcuts, windows, window and application switching, system tray elements, client-to-host and host-to-client file type association, URL redirection, browser cookie redirection, token redirection, status message interception and redirection, and other elements. These methods and systems further enhance theme-integration between a client and remote desktop or virtual machine by remoting all UI elements to a recipient for generation, including text controls, buttons, progress bars, radio buttons, list boxes, or other elements; presenting them with the receiver's product and OS-specific UI; and returning status back to the sender. This may achieve a more unified and transparent UI integration. Furthermore, international text may be correctly received in cross-language environments, or translated into the language of the presenting environment.

24 Claims, 8 Drawing Sheets

TRANSPARENT USER INTERFACE INTEGRATION BETWEEN LOCAL AND REMOTE COMPUTING ENVIRONMENTS

This application claims priority to provisional U.S. Application Ser. No. 61/448,716, filed Mar. 3, 2011, titled "Systems and Methods for Transparent User Interface Integration Between Local and Remote Computing Environments," herein incorporated by reference.

FIELD

The present disclosure relates to methods and systems for transparent user interface integration between local and remote computing environments. In particular, the present disclosure relates to methods and systems for providing a unified desktop experience of locally executed applications and remotely executed applications with locally-presented graphics.

BACKGROUND

In some environments for integrating a display of remotely generated or virtual desktop environment on a remote computing device with locally generated desktop environments on a local computing device, applications may be executed either on the remote computing device or the local client computing device, to take advantage of the processor and memory of the client. This may be done, for example, for multimedia purposes, device access issues, localization requirements, assisted computing devices, etc. However, these applications are presently difficult or confusing to use.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In one embodiment, the methods and systems described herein provide integration between remote ("published") applications and their local counterparts. In another embodiment, this functionality provides a seamless, unified user experience. In still another embodiment, this functionality allows integration of a start menu, dock, taskbar, desktop shortcuts, windows, window and application switching, system tray elements, client-to-host and host-to-client file type association, URL redirection, browser cookie redirection, token redirection, status message interception and redirection, and other elements.

In some embodiments, the methods and systems described herein enhance theme-integration between a client and remote desktop or virtual machine by remoting all UI elements to a recipient for generation, such as text controls, buttons, progress bars, radio buttons, list boxes, or other elements; then presenting them with the receiver's product and OS-specific UI; and returning status back to the sender. This may achieve a more unified and transparent UI integration. Furthermore, in some embodiments, international text may be correctly received in cross-language environments, or translated into the language of the presenting environment.

The details of various embodiments of the invention are set forth in the accompanying drawings and the description below.

BRIEF DESCRIPTION OF THE DRAWINGS

A more complete understanding of the present invention and the advantages thereof may be acquired by referring to the following description in consideration of the accompanying drawings, in which like reference numbers generally indicate identical, functionally similar, and/or structurally similar elements, and wherein.

DETAILED DESCRIPTION

Figure 1A:
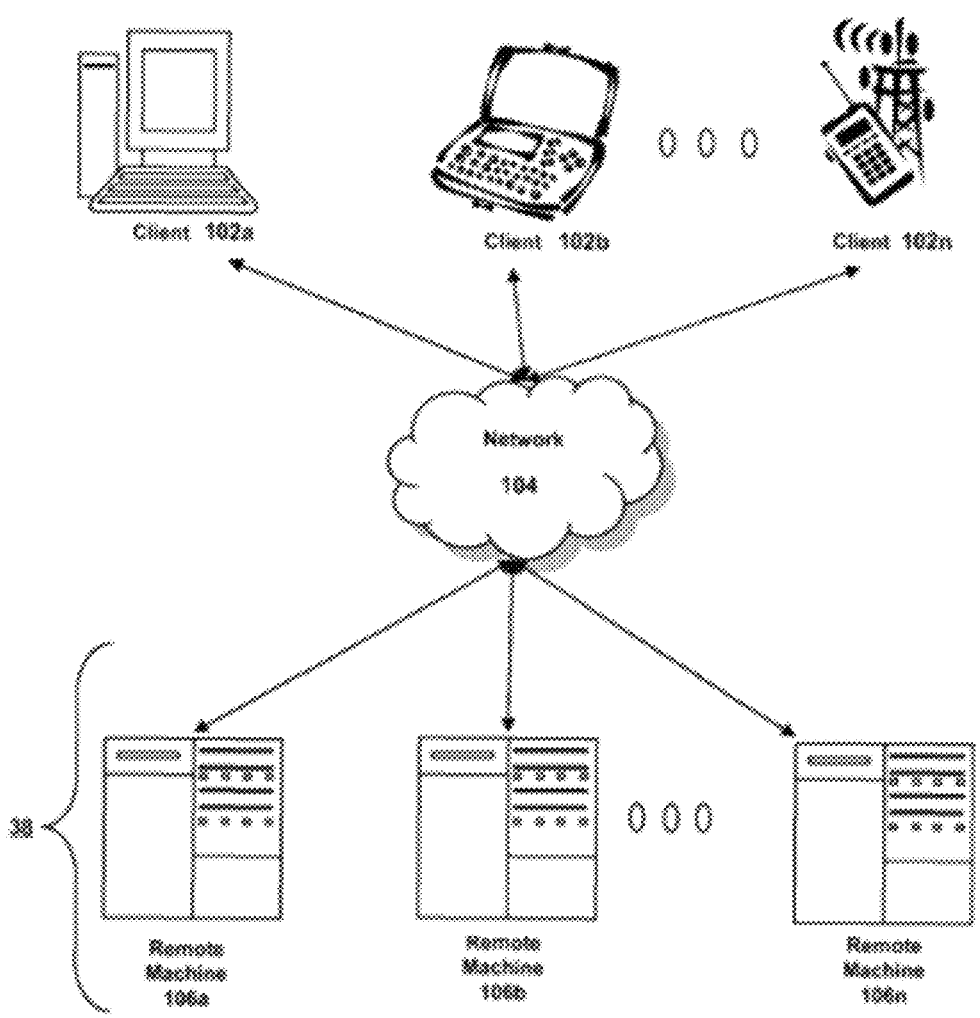
FIG. 1A is a block diagram depicting an embodiment of a network environment comprising local machines in communication with remote machines.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention. The invention is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

One or more aspects of the invention may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

For purposes of reading the description of the various embodiments below, the following descriptions of the sections of the specification and their respective contents may be helpful:

Section A describes a network environment and computing environment which may be useful for practicing embodiments described herein; and Section B describes illustrative embodiments of systems and methods for integrating local and remote applications and desktops to provide a seamless user experience.

Section C describes a specific illustrative embodiment for seamless windows using virtual channels.

Section D describes illustrative embodiments using reverse seamless functionality.

Section E describes interface configuration details according to an illustrative embodiment.

Section F describes a protocol for a control channel virtual channel according to an illustrative embodiment.

Section G describes a Transparent User Interface Integration virtual channel according to an illustrative embodiment.

Section A. Network and Computing Environment

Referring now to FIG. 1A, an embodiment of a network environment is depicted. In brief overview, the network environment comprises one or more local machines 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a local machine 102 has the capacity to function as both a client node seeking access to resources provided by a server and as a server providing access to hosted resources for other clients 102a-102n.

Although FIG. 1A shows a network 104 between the local machines 102 and the remote machines 106, the local machines 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the local machines 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks. In yet another embodiment, networks 104 and 104' may both be public networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm 38. In another of these embodiments, the remote machines 106 may be geographically dispersed. In other embodiments, a server farm 38 may be administered as a single entity. In still other embodiments, the server farm 38 comprises a plurality of server farms 38. The remote machines 106 within each server farm 38 can be heterogeneous—one or more of the remote machines 106 can operate according to one type of operating system platform (e.g., WINDOWS NT, WINDOWS 2003, WINDOWS 2008, WINDOWS 7 and WINDOWS Server 2008 R2, all of which are manufactured by Microsoft Corp. of Redmond, Wash.), while one or more of the other remote machines 106 can operate according to another type of operating system platform (e.g., Unix or Linux).

The remote machines 106 of each server farm 8 do not need to be physically proximate to another remote machine 106 in the same server farm 38. Thus, the group of remote machines 106 logically grouped as a server farm 38 may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm 38 can be increased if the remote machines 106 are connected using a local-area network (LAN) connection or some form of direct connection.

A remote machine 106 may be a file server, application server, web server, proxy server, appliance, network appliance, gateway, application gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a local machine 102. In other embodiments, a remote machine 106 executes a virtual machine, which provides an execution session within which applications execute on behalf of a user of a local machine 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a local machine 102 communicates with a remote machine 106. In one embodiment, the local machine 102 communicates directly with one of the remote machines 106 in a server farm 38. In another embodiment, the local machine 102 executes a program neighborhood application to communicate with a remote machine 106 in a server farm 38. In still another embodiment, the remote machine 106 provides the functionality of a master node. In some embodiments, the local machine 102 communicates with the remote machine 106 in the server farm 38 through a network 104. Over the network 104, the local machine 102 can, for example, request execution of various applications hosted by the remote machines 106a-106n in the server farm 38 and receive output of the results of the application execution for display. In some embodiments, only a master node provides the functionality required to identify and provide address information associated with a remote machine 106b hosting a requested application.

In one embodiment, the remote machine 106 provides the functionality of a web server. In another embodiment, the remote machine 106a receives requests from the local machine 102, forwards the requests to a second remote machine 106b and responds to the request by the local machine 102 with a response to the request from the remote machine 106b. In still another embodiment, the remote machine 106a acquires an enumeration of applications available to the local machine 102 and address information associated with a remote machine 106b hosting an application identified by the enumeration of applications. In yet another embodiment, the remote machine 106 presents the response to the request to the local machine 102 using a web interface. In one embodiment, the local machine 102 communicates directly with the remote machine 106 to access the identified application. In another embodiment, the local machine 102 receives output data, such as display data, generated by an execution of the identified application on the remote machine 106.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A local machine 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on local machine 102. In some embodiments, the application may be a server-based or a remote-based application executed on behalf of the local machine 102 on a remote machine 106. In other embodiments, the remote machine 106 may display output to the local machine 102 using any thin-client protocol, presentation layer protocol, or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the XII protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoiP) communications, such as a soft IP telephone. In further embodiments, the application comprises any application related to real-time data communications, such as applications for streaming video and/or audio.

Figure 1B:
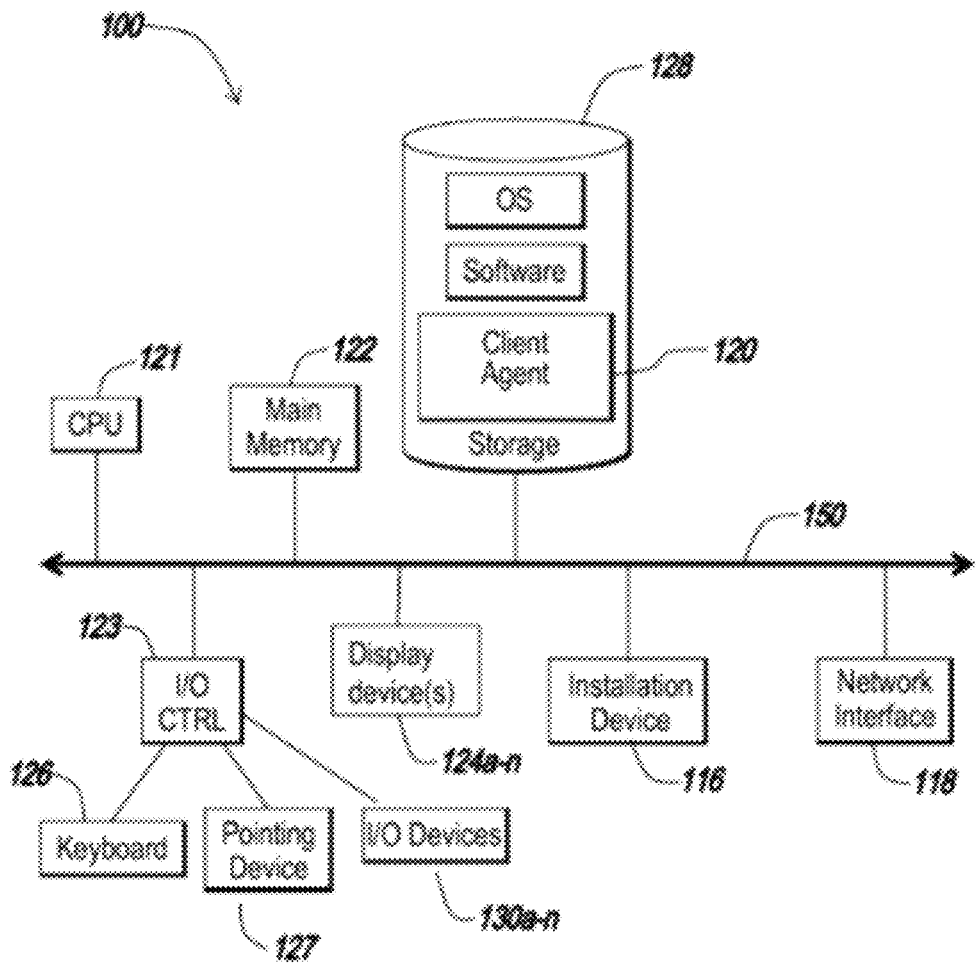
FIGS. 1B-1E are block diagrams depicting embodiments of computers useful in connection with the methods and systems described herein.
Figure 1C:
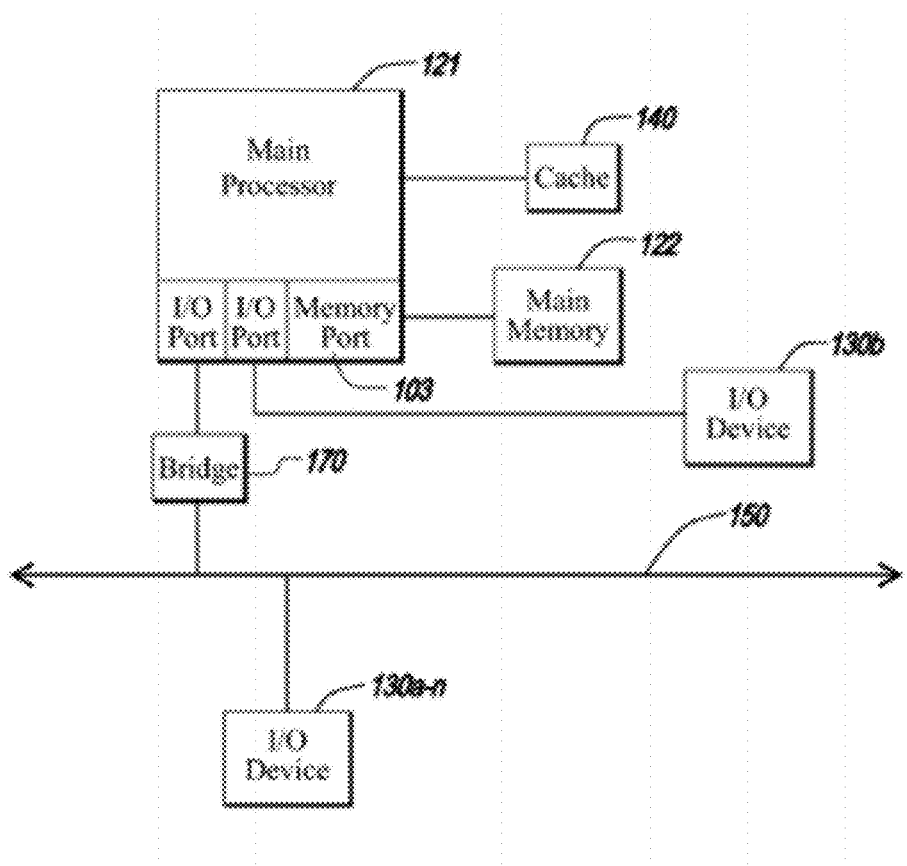

The local machine 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the local machine 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. An I/O controller 123, as shown in FIG. 1B, may control the I/O devices. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/0 device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS 7, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is a device in the iPhone line of smartphones, manufactured by Apple Inc., of Cupertino, Calif.

In one embodiment, a computing device 102a may request resources from a remote machine 106, while providing the functionality of a remote machine 106 to a client 102b. In such an embodiment, the computing device 102a may be referred to as a client with respect to data received from the remote machine 106 (which may be referred to as a server) and the computing device 102a may be referred to as a server with respect to the second client 102b. In another embodiment, the client 102 may request resources from the remote machine 106 on behalf of a user of the client 102.

Figure 1D:
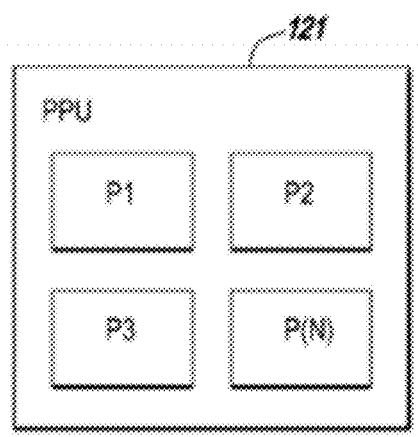

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1E:
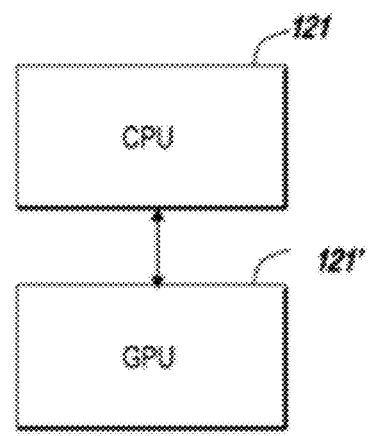

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In one embodiment, a resource may be a program, an application, a document, a file, a plurality of applications, a plurality of files, an executable program file, a desktop environment, a computing environment, or other resource made available to a user of the local computing device 102. The resource may be delivered to the local computing device 102 via a plurality of access methods including, but not limited to, conventional installation directly on the local computing device 102, delivery to the local computing device 102 via a method for application streaming, delivery to the local computing device 102 of output data generated by an execution of the resource on a third computing device 106b and communicated to the local computing device 102 via a presentation layer protocol, delivery to the local computing device 102 of output data generated by an execution of the resource via a virtual machine executing on a remote computing device 106, or execution from a removable storage device connected to the local computing device 102, such as a USB device, or via a virtual machine executing on the local computing device 102 and generating output data. In some embodiments, the local computing device 102 transmits output data generated by the execution of the resource to another client computing device 102b.

In some embodiments, a user of a local computing device 102 connects to a remote computing device 106 and views a display on the local computing device 102 of a local version of a remote desktop environment, comprising a plurality of data objects, generated on the remote computing device 106. In one of these embodiments, at least one resource is provided to the user by the remote computing device 106 (or by a second remote computing device 106b) and displayed in the remote desktop environment. However, there may be resources that the user executes on the local computing device 102, either by choice, or due to a policy or technological requirement. In another of these embodiments, the user of the local computing device 102 would prefer an integrated desktop environment providing access to all of the resources available to the user, instead of separate desktop environments for resources provided by separate machines. For example, a user may find navigating between multiple graphical displays confusing and difficult to use productively. Or, a user may wish to use the data generated by one application provided by one machine in conjunction with another resource provided by a different machine. In still another of these embodiments, requests for execution of a resource, windowing moves, application minimize/maximize, resizing windows, and termination of executing resources may be controlled by interacting with a remote desktop environment that integrates the display of the remote resources and of the local resources. In yet another of these embodiments, an application or other resource accessible via an integrated desktop environment—including those resources executed on the local computing device 102 and those executed on the remote computing device 106—is shown in a single desktop environment.

In one embodiment, data objects from a remote computing device 106 are integrated into a desktop environment generated by the local computing device 102. In another embodiment, the remote computing device 106 maintains the integrated desktop. In still another embodiment, the local computing device 102 maintains the integrated desktop.

In some embodiments, a single remote desktop environment 204 is displayed. In one of these embodiments, the remote desktop environment 204 is displayed as a full-screen desktop. In other embodiments, a plurality of remote desktop environments 204 is displayed. In one of these embodiments, one or more of the remote desktop environments are displayed in non-full-screen mode on one or more display devices 124. In another of these embodiments, the remote desktop environments are displayed in full-screen mode on individual display devices. In still another of these embodiments, one or more of the remote desktop environments are displayed in full-screen mode on one or more display devices 124.

Section B. Systems and Methods For Integrating Local and Remote Applications and Desktops to Provide a Seamless User Experience.

Figure 2:
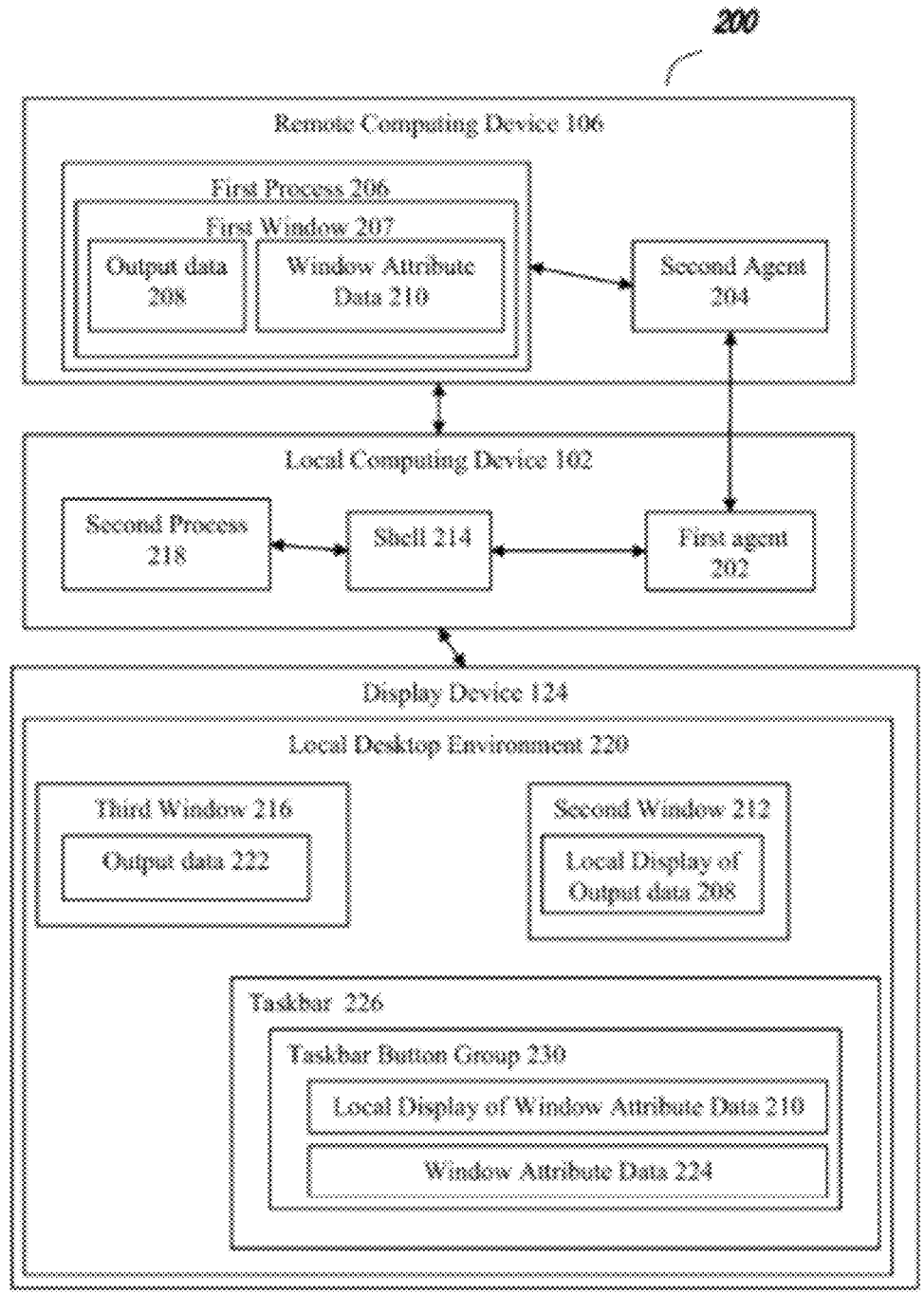
FIG. 2 is a block diagram depicting one embodiment of a system for displaying on a local machine graphical data generated on the local machine and graphical data generated on a remote machine.

Referring now to FIG. 2, a block diagram depicts one embodiment of a system for displaying, in a user interface element generated and displayed by a local machine, an identification of graphical data generated and displayed on the local machine and an identification of graphical data generated on a remote machine and displayed on the local machine. In brief overview, the system 200 includes a first agent 202 executing on a local computing device 102, a second agent 204 executing on a remote computing device 106, a first process 206 executing on the remote computing device 106, and a second process 218 executing on the local computing device 102. The first agent 202 receives, from the second agent 204, an identifier of the first process 206 and an identification of a first window 207 generated by the first process 206. The first agent 202 associates a second window 212 with the identifier of the first process 206, the second window 212 generated by the first agent 202 on the local machine 102. Responsive to the association of the second window 212 with the identifier of the first process 206, a shell 214 executing on the local machine 102 displays, in a taskbar button group 230, i) an identification of the second window 212 and ii) an identification of a third window 216, the third window 216 generated by the second process 218 and displayed on the local machine 102.

In some embodiments, a process executing on a computing device—such as the first process 206 executing on the remote computing device 106 or the second process 218 executing on the local computing device 102—generates output data and window attribute data and communicates with a shell executing on the computing device to display the output data according to the window attribute data. In some embodiments, this first process 206 may also be referred to as a remote application. In other embodiments, the first agent 202 receives graphical data and window attribute data from the second agent 204 and directs the display of the received graphical or window attribute data in a desktop environment including a plurality of data objects. In one of these embodiments, a data object is a window displayed in the desktop environment. In another one of these embodiments, the data object is a data structure storing attribute data and may or may not have an associated visible representation in the desktop environment. In still another of these embodiments, a data object is a data structure storing data associated with a user interface element—visual state, identification of associated functionality, location of graphical data, title bar contents, etc.—and a window is a graphical representation of the user interface element. In still even another of these embodiments, a shell 214 executing on a machine provides a display of user interface elements in a desktop environment. This shell may be referred to variously as a finder, a graphical user interface (GUI), a windows or X-windows interface, or any other similar term. In another of these embodiments, the shell 214 displays graphical data associated with a data object in accordance with attribute data associated with the data object. In yet another of these embodiments, the first agent 202 communicates with the shell 214 to direct the local display of remotely generated data.

Referring now to FIG. 2, and in greater detail, the first agent 202 executes on the local computing device 102. Although referred to as a first agent, in some embodiments, first agent 202 may be referred to as a local client, local client process, local client agent, or any other similar term. In one embodiment, the local computing device is a computing device as described above in connection with FIG. 1A-1E. In another embodiment, the local computing device is a client device 102, connecting to a server 106 to access one or more resources available to a user of the local computing device 102. In still another embodiment, the first agent 202 is part of a presentation layer protocol agent. In yet another embodiment, the first agent 202 is in communication with a presentation layer protocol agent.

The second agent 204 executes on the remote computing device 106. As with the first agent, in some embodiments, the second agent may be referred to as a remote agent, a remote client, a remote process, a server agent, a server process, or any other similar term. In one embodiment, the remote computing device is a computing device as described above in connection with FIG. 1A-1E. In another embodiment, the second agent 204 is part of a presentation layer protocol agent. In still another embodiment, the second agent 204 is in communication with a presentation layer protocol agent.

In some embodiments, the first agent 202 includes a receiver for receiving, from the second agent 204, data associated with a desktop environment generated on the remote machine 106. In one of these embodiments, for example, the first agent 202 includes a receiver—which may be provided as, by way of example, a dynamically linked library component—that receives window creation and window process data from the second agent 204 for use in displaying a local version of a window generated on the remote machine 106. In some embodiments, the first agent 202 may receive data, such as output data 208 and window attribute data 210 over one or more connections. In one embodiment, one or more connections may be multiplexed into one or more virtual channels. Such multiplexing may allow for different virtual channels to have different bandwidth limits or different priorities, while still being part of a single transport layer connection. This may reduce the transport layer overhead required and provide for SSL or VPN tunnel capability, while still allowing per-channel compression, buffering, and management of communication priority between second agent 204 and first agent 202. In some embodiments, such virtual channels may be dedicated to specific content types or purposes. For example, a first high-priority virtual channel may be dedicated to transmission of output data 208, while a second low-priority virtual channel may be dedicated to transmission of taskbar thumbnail images, discussed in more detail below. In some embodiments, virtual channels may be opened or closed without needing to disestablish or reestablish the transport layer connection over which they communicate.

In one embodiment, the shell 214 is software providing a user interface to the user of a computing device. In one embodiment, a shell may be supplemented or replaced with a third-party shell. In MICROSOFT WINDOWS, the default shell is EXPLORER, which determines the configuration of the desktop (e.g., the task bar, notification area, start menu, etc.). Although referred to as a shell, as discussed above, the shell may also be referred to as a graphical user interface or GUI, a finder, an explorer, a windows interface, or any other similar term.

In some embodiments, the first agent 202 includes functionality for communicating with the shell 214 to modify a display of the desktop. In one of these embodiments, the first agent 202 includes a transmitter sending instructions to a component in the operating system that generates and maintains a display of data in the desktop environment. In another of these embodiments, the first agent 202 includes a component that provides the first agent 202 with functionality for storing window attribute data or transmitting display instructions to the operating system; for example, the first agent 202 may include a dynamically-linked library component for maintaining or modifying taskbar data. In some embodiments, the transmitter is in communication with a receiver in the first agent 202 that receives window attribute data 210 and output data 208 from the second agent 204. In one of these embodiments, the receiver within the first agent 202 receives data from the second agent 204 and forwards the received data to the transmitter, which sends instructions to the operating system based upon the forwarded data. In other embodiments, the first agent 202 includes a component for storing data received from the second agent 204, such as, by way of example, window attribute data.

Figure 4A:
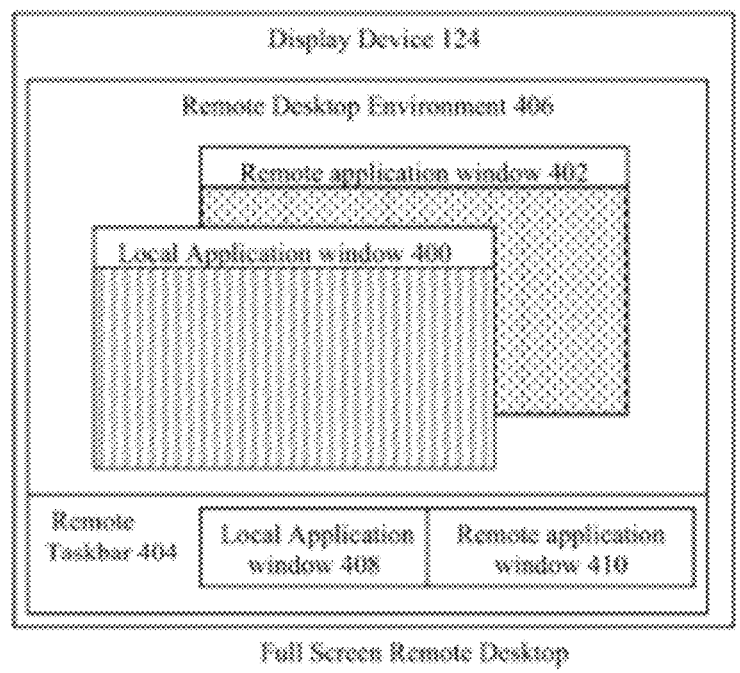
FIG. 4A is a block diagram depicting one embodiment of integration of local and remote application windows in a full-screen remote desktop.

In some embodiments, window attribute data 210 or output data 208 may comprise an icon representative of the first window 207 or first process 206. In another embodiment, window attribute data 210 or output data 208 may comprise an icon of the application or process that generated the window. In many embodiments, the first agent 202 may receive an icon or bitmap of an icon of the first process 206 or first window 207 for display within a taskbar 226 or other user interface element as a local display of window attribute data 210. Accordingly, when a taskbar button group is interacted with by a user of local computing device 102, the taskbar button group may display the received icon and/or text comprising the title of second window 212, the first window 207, or first process 206. Referring ahead briefly, an example screenshot of one such embodiment is shown in FIG. 4A, illustrating display of a notepad icon of a remote process. As shown in FIG. 4A, in these embodiments, the taskbar button group may display an icon for a remote application and a thumbnail for a local application.

Referring back to FIG. 2, in another embodiment, first agent 202 may receive a static screenshot or bitmap of output data of a first window, for display in a taskbar button group. In some embodiments, such screenshot or bitmap may be reduced in scale. For example, output data may comprise a 400 by 400 pixel window, but second agent 204 may send a 40 by 40 pixel thumbnail for display in the taskbar button group. This may reduce bandwidth requirements. Such static screenshots may be sent periodically, or responsive to user commands. For example, in one embodiment, first agent 202 may detect user interaction with the taskbar button group, interaction with a 3D or flip-3d interface, or input of an alt-tab or similar command. Responsive to detection of such interaction, in one embodiment, the first agent 202 may request a refresh of output data 208 of a window or request redraw of output data 208, receive such refreshed or redrawn output data 208, and may display a thumbnail of the newly received output data in the taskbar button group or other user interface element. In another embodiment, responsive to detection of the interaction, the first agent 202 may request a new, redrawn, or refreshed static thumbnail of the output data as discussed above.

In some embodiments, taskbar 226 may comprise functionality for displaying either an icon of an application, or a thumbnail image. In some embodiments, such thumbnail image may be rendered by taskbar 226 from the contents of a local window, while in other embodiments, the thumbnail image may be generated by another element, such as a shell 214 or local desktop environment 220, or may be retrieved from a memory element. Similar to this latter option, an application icon may be stored as a bitmap in a memory element, and taskbar 226 may retrieve the application icon from the memory element for display. Accordingly, in one embodiment, taskbar 226 may comprise functionality for retrieving an image or bitmap from a memory element and displaying the image or bitmap, agnostic to whether the image or bitmap is an icon or thumbnail. Described another way, a thumbnail image of window output may be stored as if it were an application icon, and taskbar 226 may be directed to display the thumbnail image as if it were any other application icon. This may allow for display of thumbnail images on legacy systems that only have the capability of displaying application icons.

Some versions of operating systems utilizing a taskbar may use one or more identifiers to group buttons in the taskbar. For example, Windows 7, manufactured by the Microsoft Corporation, uses AppIDs set for each window to determine how to group taskbar buttons corresponding to each window. In some embodiments, these AppIDs may be explicitly set by an application manufacturer. For example, the AppID for Microsoft Word may be explicitly set by Microsoft. When the operating system detects two taskbar buttons with an AppID corresponding to Microsoft Word, the operating system may group these buttons into a single taskbar button group. In other embodiments, AppIDs may be implicitly set. One such method involves the file system path to the process that created the window. For example, if an application is at C:\Program Files\My Company\My Application.exe, then the system may translate this file system path into a string to use as the AppID. If the application generates multiple windows, they will each have identical AppIDs, and may be appropriately grouped.

Some other versions of operating systems use just the file system path for taskbar button grouping. For example, Windows XP or Windows Vista, also by Microsoft Corporation, use just the latter method discussed above of file system paths to determine taskbar button grouping. This presents two difficulties with local display of application output from remote applications. First, the remote application that initially generated a window may have a different file system path from the local client, particularly with server-side virtualization techniques. Second, the local client may generate a window for application output, and thus the operating system may consider the path to the local client to be the proper file system path. Thus, if the local client generates two windows for two different remote applications, the operating system may interpret them as both being associated with the local client application, and thereby present them within the same taskbar group, despite them representing two distinct remote applications.

To remedy this, in some embodiments, the remote application may send remote window configuration information including the application's file system path. The local client may modify this file system path by replacing a portion of the path with a predetermined local path. For example, the remote application may be located at D:\Application Server\Remote Applications\Program Files\My Company\My Application.exe. Upon receipt, the local client may modify this path to replace the first portion, up to "Program Files", for example, with a globally unique identifier referring to the local system drive and path to the corresponding Program Files folder. This new file system path may thus comprise a combination of a local path and a remote path, and thus may be referred to as a hybrid file system path.

Referring briefly to the mechanics of taskbar grouping, different operating systems use different mechanisms for grouping taskbar buttons. For example, in many embodiments, Windows 7, discussed above, allows arbitrary grouping of taskbar buttons through associations with groups. However, Windows XP and Vista, among other operating systems, use a list representing the taskbar, with entries tagged as button groups separating entries representing a button. For example, if a list includes "Group 1, Button A, Group 2, Button B, Group 3, Button C, Button D, Button E," there will be three groups, the first two with one button each, and the third with three buttons. By default, the system may be configured to hide from display in the taskbar button groups with one button, and hide buttons in a group with a plurality of buttons. With these hidden entries not shown, the taskbar button group above would show as "Button A, Button B, Group 3," with the button for Group 3 representing three active windows.

In some embodiments, moving a button from one group to another may be performed by editing this list or changing the association of a button and group. In one embodiment, the local client may generate a new window for application output. In some embodiments, this new window may be created as part of the button group corresponding to the local client. The local client may determine a taskbar button group identifier for the new window using any of the methods discussed above. In some embodiments, the local client may search the taskbar to determine if an existing button group exists that comprises a similar identifier. For example, if a button group already exists for a notepad application, and the new window has a taskbar button group identifier corresponding to a notepad application, the local client may determine that a proper button group already exists. The local client may then move this button entry in the taskbar list to be within the button group. If the local client determines that no proper button group exists (for example, if no corresponding application is running locally or if no button group has been created for another window of the same remote application), the local client may create a new button group in the taskbar list based on the taskbar button group identifier, and move the button corresponding to the new window to this newly created button group.

Transparent UI Integration Between Local and Remote Applications and Desktops

In some embodiments, it may be desirable to centrally manage, configure, and provide or publish even applications that will be executed on a local client rather than via a remote session. This allows a user to take advantage of local processing power while still allowing administrators to centrally manage licensing and configuration. For example, an administrator can configure and publish a CAD application which may be executed on a local computer to take advantage of the local processor without incurring network delays. Publishing may be performed, in some embodiments, either by an admin console UI, graphics UI, or low-level software development kit (SDK).

In some embodiments, a published application administration system may include a command line interface for launching and managing published applications. Such command line interface may include optional parameters for the published application and/or its working directory. In many embodiments, environment variables may also be used in the command line and working directory. The environment variables may be evaluated from the client that launches the published application. In some embodiments, the command line may support any number of arbitrary parameters.

In some embodiments, published applications and file type associations may be preconfigured at time of publishing. When an administrator configures an application to be provided to and/or executed locally on a client, the administrator or publishing system may configure file type associations with the published application such that initiating launch of a type of document triggers launch of the specific associated application. Similarly, an icon or icons associated with the application may be provided to the remote system for display in shortcuts, a start menu, or other elements. Similarly, in some embodiments, a user of a local client may self-publish an application. Self-publishing may comprise the user selecting a locally installed application to execute while being integrated with a live-in desktop or other remote desktop or virtual machine display, as discussed above. In many of these embodiments, when self-publishing, the client may provide the remote system with icons and file type associations with the locally installed application, such that the remote system may include the icons within UI elements such as the start menu or taskbar generated by the remote system, and may use the file type associations to trigger launch of the locally-installed application through selection of associated files or documents.

In another embodiment, icons and file type associations for an application may be enumerated at run time of the application. These may be sent from the client to the remote system via a virtual channel, or as part of an already established communications channel. This may be done to provide both control and convenience to the administrator, such as when file type associations need to be arbitrated between different apps, such as a local browser and a remote browser. When published application icons and file type associations are preconfigured at publishing time, they may be explicitly set, or enumerated from a trusted virtual desktop appliance which has the apps installed, or enumerated from a sample client machine, or obtained in any other similar manner.

In some embodiments, by providing icons for published applications to the remote system, these published applications may appear in the start menu, dock, desktop shortcuts, or other application launching user interface generated by the remote system. In some embodiments, if a published application is not available at the connected client, it may be presented as unavailable, for example by graying out the icon, by drawing an X through the icon, by showing a smaller standard unavailable-resource overlay icon (such as a circle with a diagonal slash mark) in the lower right corner of the application icon, or via some other similar indicator.

In some embodiments, clicking on a published application icon on the remote desktop or application launcher may trigger the launch of the application on the local client. In other embodiments, a published application may be launched using a command line interface in the virtual desktop appliance session. The host of the remote session may perform security validation on both the published application and the parameters passed to the application, if any, during host-to-client launches. In some embodiments, shortcuts may be locked-down and/or contents encrypted to prevent modifications and requests to launch arbitrary processes at the client. Since the client may not necessarily trust the server, there may be a separate client-side security policy/lock down in some embodiments.

In some embodiments, client hosted applications may comprise natively installed applications, streamed/offline applications, AppV virtualized applications, ICA or RDP displayed remote applications, or applications under different operating systems. In a further embodiment, when launched from the client the configuration context of these apps may be modified accordingly.

Figure 3A:
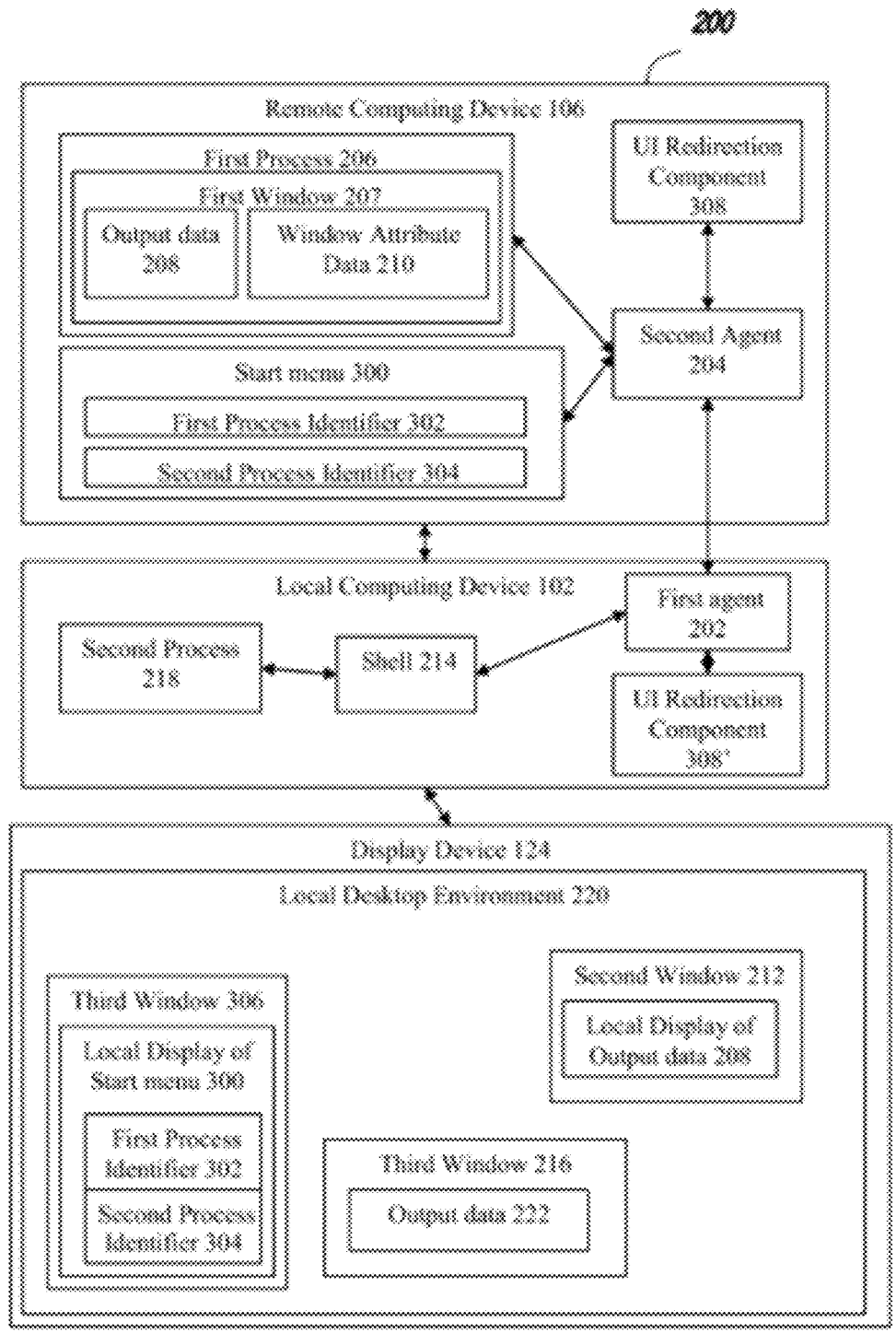
FIG. 3A is a block diagram depicting another embodiment of a system for displaying on a local machine graphical data generated on the local machine and graphical data generated on a remote machine.
Figure 3B:
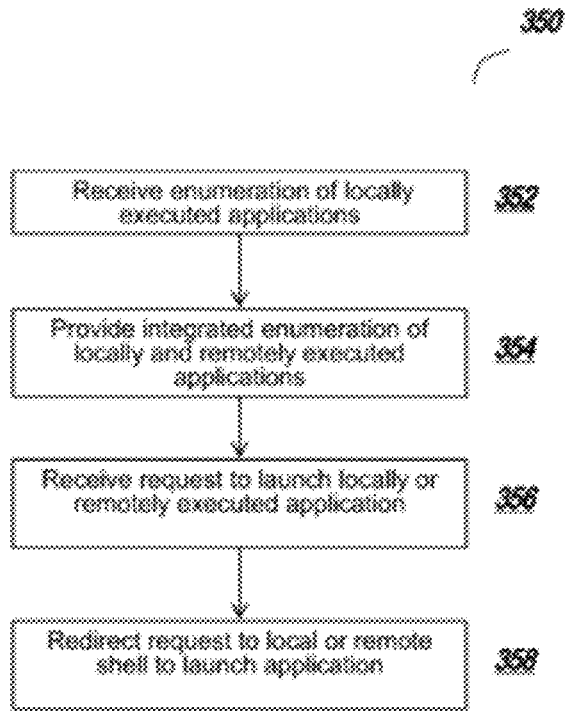
FIG. 3B is a flow diagram of an embodiment of a method for enumerating published applications and redirecting application initiation requests to a local machine.

Referring briefly to FIG. 3B, illustrated is a flow diagram of an embodiment of a method 350 for enumerating published applications and redirecting application initiation requests to a local machine. In brief overview, at step 352, a remote desktop or virtual desktop appliance, host, or server may receive an enumeration of one or more locally executed or installed applications. At step 354, the remote desktop or virtual desktop appliance, host, or server may provide an integrated enumeration of locally and remotely executed or installed applications. At step 356, the remote desktop or virtual desktop appliance, host, or server may receive a request to launch a locally or remotely executed application. At step 358, responsive to the request, the remote desktop or virtual desktop appliance, host, or server may redirect the request to one of either a local shell or a remote shell to initiate launch of the application.

Transparent Integration of UI Elements

While using local and remote applications and desktops, the user interfaces (UIs) generated by the local and remote applications desktops and presented to the user are often inconsistent and have different look and feel. For example, in some embodiments, a user of a first operating system, such as Apple's Mac OSX operating system, may view a remote application provided by a second operating system, such as Microsoft, Inc.'s Windows operating system. As a result, application windows and interface elements may have inconsistent window styles, buttons, scrollbars, etc. In addition, sometimes user interface elements are obtrusive, steal focus, do not match the language of the UIs they are integrated into. Accordingly, it may be preferable in some embodiments to seamlessly integrate server-generated UI elements with the client by using the client's look and feel. In other embodiments, it may be preferable to seamlessly integrate client-generated UI with the remote desktop by using the server's look and feel. Selection between these two embodiments may dynamically change, as a window or desktop is made full-screen, for example.

In one embodiment, a client may send information to a server regarding system metrics, system colors, and code page for encoding text data, which the server applies in the remote session. This information may also include visual themes or other elements. In one embodiment, the client's operating system may draw the title bar and borders of a local window displaying graphical output data of a remote application, allowing consistent appearance between this window and other windows generated by the client system. In a further embodiment, other elements of the local window displaying graphical output data of the remote application may still be provided by the remote operating system or copied from a logical video buffer (LVB), such as a menu bar and other non-client regions.

In a still further embodiment, all UI elements may be generated either locally or remotely for a consistent appearance. These elements may include text controls, buttons, progress bars, radio buttons, list boxes, or any other type and form of user interface element. These elements may be then presented with the receiver's product and OS-specific UI, and returning status back to the sender to achieve a more unified and transparent UI integration. Depending on the use case, the sender and the receiver could be either the client or the server, such as either local or remote desktops and applications.

Server-to-Client UI Redirection

In many remote desktop systems, when a user of a local client logs on to a remote desktop server, status messages are displayed to the user. During the first stage, while the local client is connecting the remote desktop server, a first set of status messages may be displayed by an application or agent on the local machine. Such first set of status messages may include messages indicating that a connection is being established, security credentials are being verified, etc. After connecting, a second stage may occur during which the user's profile is being loaded, a virtual machine or desktop is being initialized, etc. A second set of status messages may be generated and displayed by the remote desktop's operating system or application, and provided to the client via the remote desktop. Where the remote desktop is provided by a different operating system than the user's operating system, the UI of these second set of messages can appear inconsistent to the first set of messages generated by the user's operating system, as discussed above.

Accordingly, in one embodiment, the text of the second set of status messages may be intercepted and redirected to the client, which may present the status messages to the user in a unified fashion by using a client-side application, agent, or library component to present the messages in a uniform way, consistent with the first set of status messages presented during the first stage of the connection. These may be less obtrusive to the user.

In some embodiments, the first and/or second set of status messages may include:
Please wait . . .
Please wait for the Group Policy Client . . .
Please wait for the Local Session Manager . . .
Welcome
Preparing your desktop . . .
Please wait for the User Profile Service . . .
Please wait for the Group Policy Client . . .
Please wait for the Local Session Manager . . .
Please wait for the System Event Notification Service . . .
Preparing your desktop . . .

However, in other embodiments, other messages may be generated and displayed for the user. In one embodiment, only the string portion of the user interface, such as the welcome text, may be communicated to the client. In a further embodiment, no status or acknowledgement may be returned back to the server.

Figure 3C:
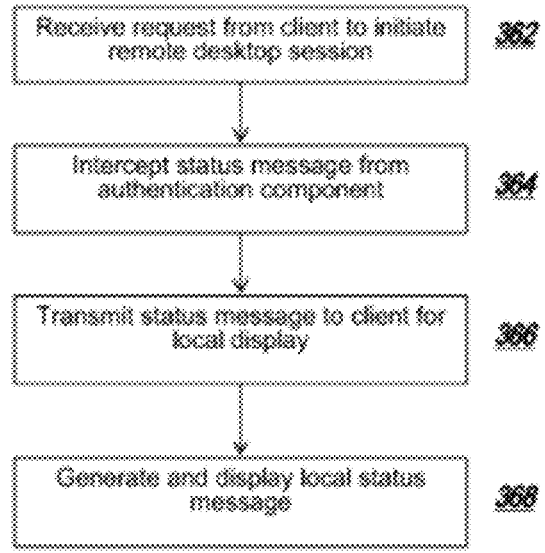
FIG. 3C is a flow diagram of an embodiment of a method for displaying remote status messages in a local format.

Referring briefly to FIG. 3C, illustrated is a flow diagram of an embodiment of a method 360 for displaying remote status messages in a local format. In brief overview, at step 362, a host virtual or remote desktop may receive a request from a client to initiate a remote desktop session. At step 364, the host may intercept or hook a status message created by an authentication component. At step 366, the host may transmit the status message, the text of the message, and/or resource identifiers or other identifiers of the status message to the client for local display. At step 368, the client may generate and display the status message locally, using graphics components of the client.

In many embodiments, the above-discussed techniques may be applied to more sophisticated UI redirection, involving individual elements of a complex UI, as well as both asynchronous and synchronous redirection and returning individual results back to the sender.

Licensing Annoyance and Licensing Error Messages

In some embodiments, licensing-related UI can be redirected to the client. Such licensing-related UI may include messages regarding expiration of licenses, authentication of licenses, purchase of extended licenses, etc Annoyance messages refer both to requests for license information and notification of an expiration of a license or an impending expiration, as well as other non-error related status information.

Rather than generating such messages at the server, a server agent can intercept these messages and send the text string and/or other information related to these messages to a client, which may then generate a message, dialog box, or other UI element in a consistent style to other local OS-generated UI elements.

Session Reconnection Related UI

In many embodiments, a user may disconnect from a remote session and reconnect to the same remote session without the server needing to re-initialize the virtual machine or desktop. This may be done for roaming purposes, such as where a user working on a remotely hosted desktop on a thin client or desktop machine switches to a laptop, and wishes to reconnect to the existing remote session without pausing the virtual machine or desktop, or needing to close and re-launch applications. In such embodiments, using the message redirection techniques discussed herein, the server-based messages regarding status of the existing session may be redirected to the client operating system, whether on the desktop machine or laptop, such that the client operating system may present the UI element natively Shadowing Prompt and Indicator UI Shadowing, in many embodiments, refers to the ability of system administrators to connect to a user's remote desktop, virtual machine, or virtual desktop session. This may be done for maintenance or teaching purposes, monitoring purposes, or other reasons. Such connections may be viewing-only, or may provide the administrator the ability to move a mouse cursor, execute applications, and input data. In many embodiments, when a session is shadowed by a secondary user or administrator, the first user is presented with a user interface element that indicates shadowing is taking place, such as a system tray pop-up or indicator or other element. In some embodiments, the first user may be presented with a dialog box or other user interface element when shadowing is requested, such that the user may grant permission for shadowing his or her session. This may be done to allow the user to close confidential or sensitive files prior to a help desk technician connecting to make an adjustment to system settings. Rather than displaying these user-interface elements as generated by the server, using the techniques discussed herein, the server may intercept and redirect the information, status, permission dialog, or other element to the client, such that the client's operating system may generate a corresponding user interface element.

Early Authentication (Network-level Authentication) UI

Network-level authentication may comprise security UI prompting for authentication at the stack level before a remote session is created. This may be done to prevent denial-of-service attacks or brute-force password hacking. Because such authentication takes place prior to the session being established, server-generated UI elements may not be available. Accordingly, it may be preferable to generate the user-interface on the client prior to the session being initiated, and then redirecting user credentials to the server once communications are established.

Smart Auditor UI

In many embodiments, the client and/or server may provide the ability to record a session, or record user interaction with a remote session such as keyboard and mouse input. To provide confirmation and notification that recording is underway, it may be desirable to provide a user interface element, such as a recording or "on-air" light to inform the user that the session is being recorded. In many embodiments, using the techniques discussed herein, a server beginning recording may intercept a recording status message on the server and redirect the status to the client, such that the client may generate a corresponding user interface element in a style consistent with the client-side operating system.

Third Party UIs

Utilizing the techniques discussed herein, any third party UI that can be decomposed into redirectable elements and is considered to be an aberration from a seamless user experience or is otherwise annoying, may also be intercepted, redirected, and presented on the client in a uniform and less obtrusive manner. At the same time, the server-generated UI can be hidden, so it is not visible to the user. For example, the Outlook application manufactured by Microsoft, Inc. frequently generates user interface elements to notify a user of appointments or tasks, request confirmation before deleting meeting requests, or perform other tasks. These queries, status information dialogs, or other elements may be intercepted on the server and redirected to a client, such that the client may generate the messages in a consistent style.

Client-to-Server UI Redirection

Similar to the above-discussed techniques, in many embodiments it may be desirable to intercept status messages or other UI elements generated by the client and redirect these elements to the server for generation and display. This may be done where client-side user interface elements may be inconsistent or confusing in appearance (such as a locally-generated popup in one OS style appearing over a full-screen remotely generated desktop in another style), or confusing in context (such as a low-battery indicator from the local user's laptop appearing over a remote desktop hosted on a non-battery powered server). Several examples are detailed below.

Live-in Desktop

In many embodiments, a user may view a remote desktop or virtual machine in a full-screen or non-windowed display. This may be referred to as a live-in desktop, indicating that the user's experience "lives" in the remote or virtual desktop rather than their local desktop. Because a live-in desktop covers over local UI elements, such as local taskbars or system tray elements, docks, menus, and other elements, if a local application or client agent needs to display a user interface element, such user interface element may be hidden behind the live-in desktop. Accordingly, in some embodiments, these user interface elements may be intercepted and redirected to the remote desktop or virtual machine session, such that the element may be presented using the server's look and feel. Thus, these elements would then appear in the hosted desktop and be visible to the user.

Figure 4B:
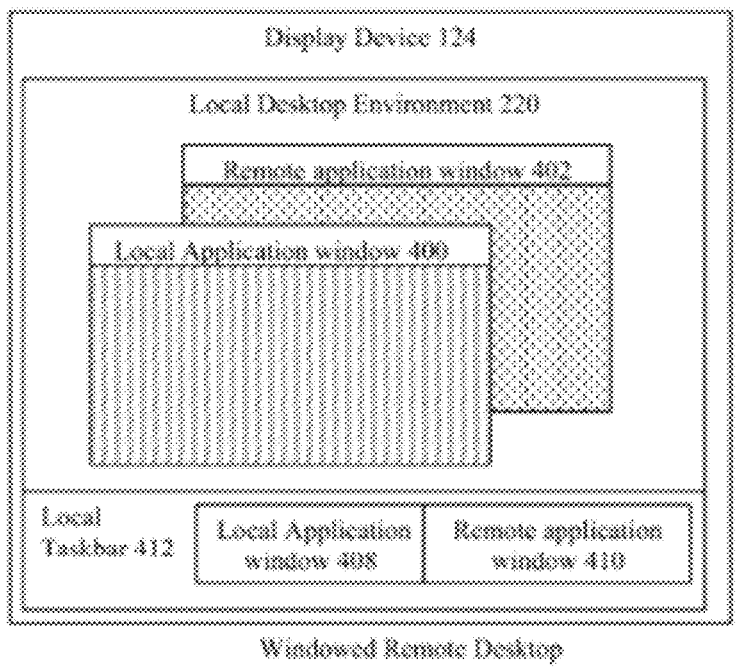
FIG. 4B is a block diagram depicting another embodiment of integration of local and remote application windows in a local desktop with a windowed remote desktop.

Referring briefly to FIGS. 4A and 4B, illustrated are block diagrams depicting embodiments of integration of local and remote application windows. FIG. 4A depicts integration in a full-screen remote desktop, and FIG. 4B depicts integration in a windowed remote desktop. In brief overview, integrated desktops may include a local application window 400 and remote application window 402. In a full-screen mode, the display may include a remote desktop environment 406, while in a windowed mode, the display may include a local desktop environment 220. In the full-screen mode, a remote taskbar 404 generated on the remote host may include buttons representative of local and remote processes, such as local application window button 408 and remote application button 410. Similarly, in many embodiments of a windowed remote desktop, the local desktop environment 220 may include a local taskbar 412, with local application window button 408 and remote application button 410. As discussed above, when in full screen mode, the local application window button 408 may be redirected to and generated by the remote host. This may be done because the local taskbar 412 may be hidden behind or underneath the remote desktop environment 406 and/or remote taskbar 404. Similarly, when in windowed mode, the remote application window button 410 may be redirected to and generated by the client. This may be done because the remote taskbar 404 may be hidden or not transmitted to the client.

Reverse Seamless

In several embodiments of the technique referred to as Reverse Seamless applications, local application windows may be seamlessly integrated with the full-screen remote desktop, as though they are running remotely. In some embodiments, the window graphics of the reverse-integrated windows are still generated by the local client. This poses the same problems of different look and feel between locally and remotely generated UIs. Accordingly, in one embodiment, by using the redirection techniques discussed herein, user interface elements of these client windows such as window titles or menu bars, scroll bars, or other elements may be intercepted and redirected to the server for generation. Window contents may still be read from the local logical video buffer (LVB) to display local application output.

For example, in one embodiment, straight reverse-seamless Systray integration of some messages might be confusing to the end-user. As discussed above, a "Low battery" message in the Systray of a full-screen virtual or remote desktop session might be interpreted to mean that the remote virtual machine's battery is dying, even though the virtual machine does not have a battery. Accordingly, it may be desirable to intercept and redirect such messages for presentation in another format. For example, a modified message or UI element may be displayed to explicitly indicate that the laptop battery is low.

Improved Localization

In many embodiments, client and server environments may use different language configurations. For example, the server may be configured to provide English messages and notifications, while the client operates in Spanish. In one embodiment of the systems and methods discussed herein, the sender may specify resource IDs for message strings in UI elements. When intercepting and redirecting these elements, the resource ID may be provided, allowing the receiver to use a local resource table to retrieve and present an alternate language version of the message string as a static translation (e.g., table-based). In many embodiments, the sender may also send the actual text. When the resource ID is unknown to the receiver or is not supplied, the receiver may utilize a dynamic translation of the actual text, such as via a local or remote dictionary or language translation utility. This approach provides for a more uniform user experience.

In many embodiments, redirection of UI elements may be performed in both server-to-client and client-to-server directions, frequently simultaneously. Furthermore, different UI elements may require asynchronous or synchronous operations, and in some cases results may need to be returned to the sender. An example may include a dialog box with confirmation and cancelation buttons. The dialog box generated at the sender needs to be intercepted and redirected to the receiver, but maintained. When the user selects a button on the corresponding receiver-generated dialog box, the result may be intercepted and redirected back to the sender-generated dialog box, allowing operations to proceed in accordance with the user's wishes.

Window Mode Switching

In many embodiments, the user may have the ability to switch between windowed operation and full-screen window mode or live-in desktops, as discussed above. This may require different redirection of user interface elements for the best end user experience. For example, if the user switches the remote connection from windowed to full-screen mode, a redirected UI presented locally at the client may no longer be visible, since it will be hidden behind the full-screen desktop. Accordingly, in some embodiments, the UI may be integrated into the remote session as a reverse-seamless window. In other embodiments, the redirection may be paused or re-redirected to fall-back to server-based rendering. Alternatively, a switch from full-screen to windowed mode could trigger redirection of a UI previously rendered on the server.

Roaming and Reconnect

In many embodiments, remote desktop or machine sessions may include functionality for automatic client reconnect (ACR). This may be performed when there has been a full disconnect from the session, and may comprise reconnection to the disconnected session. Similarly, in many embodiments, remote desktop or machine sessions may include functionality for roaming, allowing a user to reconnect to a disconnected session either manually or automatically from another client machine. Some redirected UI elements may have been asynchronously sent to the original client machine, while others might have been synchronous with a pending user action. In some embodiments, the previously sent asynchronous UI elements may not be recreated, such that they will not be seen on the new client. This may be done, for example, to prevent a previously redirected low-battery indicator from appearing on a resumed session on a non-battery powered desktop. In many embodiments, previously sent synchronous/blocking UI elements may be recreated and redirected if no response had been received from the original client prior to the disconnect. For example, if a dialog box was presented to the user prior to the disconnect, the dialog box may be recreated and retransmitted to the client for regeneration and display.

Pass-Through and Shadowing Pass-Through

In many embodiments, a user may view multiple nested remote desktop or virtual machine sessions. For example, a user of a first computing device may view a remote desktop of a second computing device, which itself is displaying a remote desktop of a third computing device. In some embodiments, the UI elements from the most-upstream client (e.g., the third computing device), may be redirected to and rendered on the client at which they are intended to be shown, such as the most-downstream client (e.g., the first computing device). In other embodiments, such as where the user is viewing a full-screen or live-in desktop, no local UI may be presented. Accordingly, the rendering may be performed in the remote desktop session, such as the client next upstream from the user's client. In many embodiments, the exact behavior may be controlled via policies specified by the user, an administrator or application manufacturer.

Similar to the scenarios discussed above, when a user of a first computing device, such as a help desk technician, shadows a second computing device, this is similar to the first computing device connecting to a remote session of the second computing device. If the second computing device is itself viewing a remote desktop or virtual machine of a third computing device, in some embodiments, UI elements generated by the third computing device may be redirected to the second computing device, rather than passed-through to the first computing device. This allows the user to still view these items even when being shadowed. However, the shadower may not be able to view or interact with the UI elements.

Accordingly, in many embodiments, the third computing device may be configured to redirect UI elements to both the second and the first computing devices, allowing both the shadower and shadowed user to view and interact with these elements. In other embodiments, redirection may be disabled such that UI element generation is performed at the third computing device and presented as application output graphics to the second computing device, and by extension, the first computing device.

Referring now to FIG. 3A, illustrated is a block diagram of an embodiment of a system for UI redirection. The following description discusses primarily server-to-client UI redirection, but one of skill in the art may readily appreciate that redirection can also occur client-to-server, in which case the same concepts apply except that the roles of the client and the server are reversed. In brief overview, a server or remote computing device 106 may redirect user interface elements from a process 206 provided by an operating system manufacturer or a third party, an operating system UI element such as a start menu 300 or systray or other elements (not shown), or any other element. In some embodiments, the second agent 204 may call to or read from a UI redirection component 308, which may comprise a library, database, or other logic.

In some embodiments, such as where first process 206 is provided by a third-party manufacturer, the individual elements of UIs generated by the first process 206 may be redirected using API hooks via a system library, such as the Windows UI Automation API or the user32.dll provided as part of the Windows operating system by Microsoft, Inc. Such API calls may include MessageBox, MessageBoxEx, CreateDialog, DialogBox, SetDlgItemInt, SetDlgItemText, or any other API that provides information about the format, style, and/or contents of a user interface element. In some embodiments, the hooked APIs may then be redirected using UI Redirection Component APIs provided by UI redirection component 308. In one embodiment, the native windows in the session generated by the process or operating system and representing hooked messages boxes, dialogs, or other user interface elements may be hidden, for example via an API call such as ShowWindow(hWnd, SW_HIDE). This may be done in order to prevent generation of graphics for them on the remote computing device 106 that would have to be transmitted to the local computing device 102 for display.

In some embodiments, the UI Redirection Component 308 may make further identifications of the type of session, such as a console session, an ICA session, an RDP session, or any other type of session. In other embodiments, the UI Redirection component 308 may make policy decisions, such as whether redirection is enabled or disabled; whether redirection is enabled in pass-through mode as discussed above; whether redirection is enabled during shadowing; or any other policy decisions needed to properly redirect and generate UI elements. Responsive to these policies, the UI redirection component 308 may direct the operating system of the remote computing device 106 and/or of the local computing device 102 to:

Render the UI locally and natively. In one embodiment, this may comprise generating an error code to the second agent 204 or a hooking component of the second agent 204 or UI redirection component 308, thus triggering fallback to local and native rendering by the operating system, process, or other user interface generator.

Render the UI locally. In one embodiment, this may comprise generating UI elements via second agent 204 or a graphics engine directed by second agent 204, without redirecting UI elements via the network. This may be done to provide a unified theme for UI elements generated on the remote computing device.

Redirect the UI elements over the Transparent UI Integration Virtual Channel. In one embodiment, this may comprise redirecting UI elements via a virtual channel between second agent 204 and first agent 202 or between remote computing device 106 and local computing device 102 to allow the local computing device 102 or an operating system of local computing device 102 to render the UI elements using its local look and feel.

In some embodiments, some calls to the UI Redirection Component APIs may result in asynchronous/non-blocking calls, such as a call to remote a simple text UI element, while others can be synchronous/blocking, such as to remote a Yes/No dialog button that requires a response from the user. In many embodiments, the UI Redirection Component APIs may support multiple simultaneous instances of UI redirection (contexts) per remote session. In a further embodiment, clients of the API may run under different security contexts and both in and out of session space.

The Transparent UI Integration Virtual Channel discussed above may be implemented in a number of different ways. In some embodiments, the virtual channel may comprise a generic virtual channel, a dynamic virtual channel, or a static virtual channel. The choice of virtual channel may be performed responsive to portability requirements of the system. Dynamic virtual channels may provide automatic packet fragmentation/reassembly for large data messages, such as those larger than 5 KB; automatic multiplexing/demultiplexing of messages for multiple simultaneous instances of UI redirection (contexts) per session. Generic virtual channels may provide advanced features for hosting; providing session notifications; fulfilling security requirements; performing common state management between the sides of a connection; and cache optimization.

In some embodiments, the virtual channel may use a protocol that provides flexible UI integration host-to-client. Such a protocol may include asynchronous and synchronous calls with status results. The protocol may comprise fields and/or identifiers for different UI elements within a UI container, such as a window. These elements may include text strings, progress bars, buttons, or any other type and form of user interface elements. The protocol may also include class IDs to define different UI element types, and/or resource IDs to define different instances of UI elements. In other embodiments, the protocol may also include request IDs to identify unique UI redirection contexts/containers and to match requests with responses. In still other embodiments, the protocol may provide flags or request labels for different actions, such as addition, update, removal of arbitrary UI elements within a context, or any other action. As discussed above, to provide for language translation and localization, the protocol may include support for different language locales and translation based on Resource ID. In many embodiments, the protocol may include support for automatic packet fragmentation and reassembly for large data and multiplexing or demultiplexing of different contexts, such as fragmentation flags, sequence or channel IDs, or any other information.

In many embodiments, first agent 202 may include a corresponding UI redirection component 308' similar to UI redirection component 308. On the client side, in many embodiments, the UI redirection component 308' may implement the Transparent UI Integration protocol described above. In one embodiment, UI redirection components 308 may comprise a library or DLL for receiving and transmitting virtual channel communications on different contexts or virtual channel instances.

In many embodiments, the Client Virtual Channel Component, first agent 202, or UI redirection component 308' may delegate UI rendering to a UI Rendering Platform Abstraction layer provided by shell 214 or first agent 202. This abstraction layer may have a platform-common interface but with different implementations depending on the native operating system. The Platform Abstraction layer may be used to render the UI natively thus ensuring seamless integration with the client's look and feel.

In a further embodiment, the platform abstraction layer may delegate rendering to an application or process running on the client, or may use a rendering library to render the UI in the client's process space with a consistent look and feel. In still other embodiments, the Platform Abstraction layer may be used to perform direct translation of text into the local language using a resource table and the Resource ID of text UI elements. In some embodiments, as discussed above, virtual channel transmissions may include the actual text of UI elements, which may be used by the client in case the Resource ID is not supplied or is unknown. In yet another embodiment, text can be dynamically translated using local or remote dictionaries.

Selective Integration of Visual and Functional Application Features

In many implementations of published applications, there may be usability and security considerations which necessitate selective integration of the applications, as opposed to integration of all local applications. This selective integration may affect application windows, the system tray, file type association handling, or other UI elements. For example, in many embodiments, only the following windows are expected to be integrated into the remote desktop or virtual desktop session (sometimes referred to as a virtual desktop appliance or VDA session):

(1) Windows from a published application process that are launched from that remote or virtual desktop session.
(2) Windows from a published application process that are launched via file type association from the remote or virtual desktop session.
(3) Any windows belonging to a child process of processes from either #1 or #2.

The same may apply to systray integration or other UI element integration of published applications in the remote or virtual desktop session.

In many embodiments, any other local client windows will remain on the client desktop and will not be integrated into the desktop of the remote or virtual desktop session. This may include special windows from authentication windows or status messages from windows of the remote or virtual desktop client application, in some embodiments. However, based on policy configuration, some windows or system tray items may be allowed to show through the remote desktop, such as an authentication prompt, user access control elevation prompt, a laptop's battery meter, etc.

In a multi-monitor setup, in many embodiments, separate remote or virtual desktop sessions can be launched from the same client and assigned to different subsets of monitors (sometimes referred to as a multi-VDA scenario). A client UI may be provided for the user to assign monitors to the remote or virtual desktop sessions. In some embodiments, a subset of monitors may be preserved for the local desktop. In a further embodiment, published applications and their child processes may be associated with their parent remote or virtual desktop sessions from which they were launched. This association may include window and systray integration, file type association (FTA) handling, and other UI elements. The window association can be managed in different ways:

Block application transition from VDA-to-VDA, VDA-to-Local or Local-to-VDA desktops. In other words, the system may prevent users from dragging windows across VDA session boundaries.

Allow full transitions, allowing the user to drag windows across monitors and VDA sessions.

Allow dragging off-screen partially but not fully, as long the mouse stays in the parent VDA session. Clipping may also be performed. In one embodiment, as the published application window is moved, the system may set or limit its window region, such that it is properly clipped by the VDA session boundary. In another embodiment, the published application window may be set to be identified as a child of the VDA session window. In a further embodiment, the clip-siblings window attribute of the VDA session window may be set such that the published application window is automatically clipped by the client operating system.

In some embodiments, in order to manage window associations properly, the client may maintain a complete hierarchy of parent-child relationships for processes and their windows. This may be straightforward for the case when a published application process is directly launched by the remote host, or when a published application directly launches another process via the CreateProcess API or other interface. However, it may be more complicated when a published application is launched via a file type association, in which case the launched application may become a child process of the remote shell, or in the case when it is launched via a component object model and becomes a child of a hosted service manager instance. To detect the correct parent-child relationship, in some embodiments, the API used to launch the published application may be hooked or intercepted to monitor launching of applications.

In some embodiments, special handling may be required for single-instance applications, such as the Windows Media Player provided by Microsoft, Inc. In one such embodiment, the system may not allow launching of an instance of the application on the host, if already launched as a published application on the client.

In some embodiments, to allow proper working area for published applications for purposes of maximizing/minimizing and restoring window positioning, the VDA desktop's work area boundaries may be sent from the host to the client. Accordingly, published applications may then maximize by correctly acknowledging the VDA's taskbar size and position as opposed to the local desktop's taskbar, which could have a different position and/or size.

In many embodiments, local published application windows may be removed from the local desktop's taskbar by the client agent or a service of the remote desktop client, and restored upon disconnect/log-off from the remote VDA session. This may be done to help create the false appearance that published applications are not local, while the VDA is active.

In some embodiments, when the VDA goes into windowed mode, published application windows may be minimized and removed from the VDA. In one embodiment, the taskbar entries may stay on the VDA taskbar, while in another embodiment, they may be removed. When the VDA returns to full screen mode, the published applications may be restored to resume normal operation.

Better-than-Local Experience

In some embodiments, such as where the remote desktop's visual themes are different from the client desktop's visual themes, the methods and systems discussed herein may provide the opportunity to represent the remote VDA's windows with the local client theme and thus blend them seamlessly with published applications. First, in a server-side embodiment, client-side settings for the appearance of window titles, borders, font types, sizes, colors, or similar theme settings may be transmitted to the server and used in the session. Second, in a client-side embodiment, the local client may generate window titles and borders for remote application windows, rather than drawing these elements from the local video buffer.

This also allows features of newer versions of operating systems executed by the local desktop to be applied to windows of remote desktop applications running older or different versions of the operating system. For example, Windows 7 by Microsoft, Inc. includes various UI animations and features including snap-to-side, shake, glass, etc. By creating all of the remote desktop's windows as local windows for title bars and borders as discussed above, these local windows may take advantage of these features, even when the remote desktop is executing an older version of Windows, such as Windows XP, or another operating system altogether. Similarly, the same technique can be applied in reverse to allow features of the remote desktop's operating system to apply to local windows. In one such embodiment, a proxy window may be created on the remote desktop or virtual machine for each window of a published application or applications on the local client. Graphics of these proxy windows, including title bars and borders, may be transmitted to the local client, and merged with the window contents generated by the local application. Accordingly, local published applications running on an older operating system, such as Windows XP, can have the look and feel of a newer operating system, such as Windows 7.

Reverse Seamless Application Roaming

In some embodiments, if the remote desktop or virtual machine logs off or shuts down, existing published application windows may also be closed, via a API call to the local client's window manager, and processes associated with these windows may be gracefully exited. This may be done to perpetuate the illusion that these windows come from the remote machine.

In other embodiments, on a user-triggered VDA disconnect, the published application windows may stay open on the client as local windows, effectively orphaning these windows. This may be done to allow the user to continue working off-line. In many embodiments, the user may reconnect after disconnecting, either from the same or a different client. Furthermore, in many embodiments, the published application windows may have been closed prior to reconnection, or become unavailable (if reconnecting from a new client). In still other embodiments, the reconnection may have quickly and silently occurred via an automatic client reconnection (ACR) system. Accordingly, specific behaviors for windows may be applied. These behaviors for reintegrating existing published applications or re-launching them following reconnection may include:
  (1) No reintegration;
  (2) Silent and automatic reintegration;
  (3) Let the user decide by prompting and optionally re-launch published applications;
  (4) Gracefully close published applications at previous client during roaming to a new client; or
  (5) Re-launch published applications at new client during roaming, possibly in combination with closing published applications at previous client.

In many embodiments, user-configurable policies may be used to determine which behavior to apply.

Bi-directional File Type Association (FTA) Integration

In some embodiments, file type associations may be passed from client to host for published applications, or from host to client or client to client. In many embodiments, the client may replace all file type associations (such as shell-open commands in the registry or direct hooking of ShellExecute/ShellExecuteEx and CreateProcess APIs) to point to a remote desktop client or client agent. The remote desktop client or client agent may then redirect these commands to the remote desktop or virtual desktop host, which may perform file type association arbitration. The hierarchy for arbitration between local and remote computing environments may comprise:
  (1) Published file type associations for published applications (Could be client-native, streamed, ICA, RDP, etc.).
  (2) Client-enumerated file type associations for published applications (Could be client-native, streamed, ICA, RDP, etc.).
  (3) File type associations in the VDA session (Could be VDA-native, streamed, ICA, RDP, etc)

Generally, in these embodiments, a client application is not engaged even if it owns the file type associations, unless the application is published as a published application. This allows consistent management by keeping applications associated with the parent VDA and locking down local environments. In many embodiments, exceptions are possible based on policy configurations.

In some embodiments, host-to-client file type association redirection occurs when a user clicks on a file in the VDA and it gets redirected to a published application as per (1) or (2) above. In other embodiments, client-to-host file type association redirection occurs when a user interacts with one published application and launches embedded content associated with a VDA-hosted application as per (3) above. For example, in one such embodiment, opening a .doc attachment in a published copy of the Outlook email program provided by Microsoft, Inc., may launch a VDA-hosted copy of Microsoft Word.

In some embodiments, client-to-client file type association redirection may occur when a user interacts with one published application and launches embedded content associated with another published application as per (1) or (2) above. For example, opening a .doc attachment in a published copy of the Outlook email program may launch a published copy of Microsoft Word. Even in such client-to-client file type association redirection, the redirection is still arbitrated by the VDA. In many embodiments, this excludes redirection to non-published client applications as well as applications published by other non-parent VDAs, providing centralized management. For example, launching of the .doc file will fail if there is no published copy of Microsoft Word or parent-VDA-hosted Microsoft Word, even if there is a local non-published copy of Microsoft Word.

The file type associations discussed above may be communicated between the host and client or agents of the host and/or client via, in some embodiments, a virtual channel of the established remote desktop session.

Bi-Directional URL Integration

In many embodiments, using similar techniques to those discussed above with file type association redirection, uniform resource links (URLs) can also be redirected between the host and client. In these embodiments, published applications and host VDAs may be located across different network environments, including different geographies. Accordingly, users may wish to include URL redirection for several reasons:
  Access restrictions on web or ftp sites based on locale and/or user privileges;
  Different content delivered by web sites based on locale, such as search engines that deliver different results based on country of origin of the query;
  Flash acceleration not working well over high latency links, such as WANs;

Remote Audio/Video Extensions (RAVE) not supporting content in formats of RealMedia, manufactured by RealNetworks, Inc. or QuickTime, manufactured by Apple Computers, Inc.; and Lack of Microsoft Silverlight support at a client or host computer or display via a presentation protocol.

In some embodiments, bi-directional URL redirection may include application-to-web-browser redirection. For example, if a user clicks on a URL link in an e-mail window presented by a published copy of Microsoft Outlook, the URL may be redirected to the remote VDA and opened in a browser executing in the remote or virtual desktop. This may be done using shell-open commands, similar to the file type association redirection described above.

In other embodiments, URL redirection may include in-web-browser redirection. For example, if a user browses a web page in a web browser executing in the remote or virtual desktop and clicks on another link referenced from the web page, the link may be redirected to and opened by a published web browser running on the client. In such embodiments, the shell does not get involved. Rather, in these embodiments, the browser may handle the links natively. In one embodiment, the URL may be intercepted by a browser helper object or plug-in. Different plug-ins may be required for different browsers. In another embodiment, the URL may be intercepted by hooking calls to the Windows HTTP Services (WinHTTP) API or a similar API provided by the operating system of the remote or virtual desktop.

In many embodiments, URL redirection may be performed responsive to one or more policies. These policies may be based on security zones, white-lists and black-lists, or any other information, with the rationale of minimizing configurations for the most common requirements. The policies may, in some embodiments, be implemented by URL matching, flexible pattern matching, wild cards, or any other type and form of policy application. For example, in one embodiment of a policy, a white list may exist on the client side such that only the listed URLs are handled by the published web browser from the client. Any other web content will be redirected to the browser within the VDA. In another embodiment of a policy, a black list may exist on the VDA side such that the listed URLs are sent to the published browser and handled from the client side. Any other web content will be processed within the VDA session. In some embodiments, URLs in different protocols such as HTTP, MMS, FTP, or any other protocol may be intercepted and redirected.

In some embodiments, in case of redirection errors or errors in accessing content (e.g. a 404 error received by the redirected-to browser), a fallback function may include reaccessing the content by the other browser. This may also be helpful where the different browsers may receive different error messages, for instance due to being inside a firewall or company network. In one embodiment of client-side fallback, when a URL is in the white list but local client launching fails, the system may fallback to VDA launch by redirecting the URL back to the remote VDA browser. In another similar embodiment, when the URL is not in the white list but launch on the VDA browser fails, the system may fallback to local client launch by redirecting the URL back to the published browser on the client. Similarly, in one embodiment of server or remote-side fallback, when a URL is not in the black list but launch on the VDA browser fails, the system may fallback to local client launch by redirecting the URL back to the published browser. In another embodiment, when the URL is in the black list but local client launch fails, the system may fallback to VDA launch by redirecting the URL back to the remote VDA browser.

In some embodiments, web cookies and tokens may also be synchronized between published applications and the virtual or remote desktop. In addition, cookies may be sandboxed so they do not affect other browser sessions, including multi-VDA scenarios.

User Authentication Redirection

In many embodiments, it may be desirable to redirect authentication credentials from the host to client or vice versa, to allow one system to execute applications as the user of the other system. For example, the user could be authenticated to the client environment as identity A or might use an anonymous user account, as in a kiosk type environment. The user may then launch the remote or virtual desktop session and authenticate as identity B. By default, published applications will run in the context of A. However, in many embodiments, the published applications need to run in the context of B in order to access domain resources similar to applications running in the VDA.

In one embodiment of a solution, the system may use Kerberos over SSPI (Security Support Provider Interface). Following authentication to the VDA, the server agent on the VDA calls SSPI to retrieve a service ticket and encrypted authenticator in an opaque array of bytes, known as SSPI data. The SSPI data may then be sent to the client agent over a virtual channel of the remote communications session. The client may call SSPI and pass it the SSPI data obtained from the server agent. SSPI may authenticate the user and return a logon token. The client can then use the logon token to launch published applications in the context of B. In some embodiments, the client may be in the same domain as the VDA or in a trusted domain of the VDA. In many embodiments, launching published applications under the VDA's user context can be configured via a policy on a per-application basis.

Server Drive and Printer Mapping

Normally, published applications may access local client drives as well as shared network drives. However, in many instances, these published applications may also need to access the VDA's drives, similar to applications running in the VDA. Therefore, in one embodiment of the system discussed herein, server drives from the parent VDA may be enumerated and accessible in the context of a corresponding client published application. This may be accomplished through enumeration of the server drives; mapping of the server drives to network drives or other accessible drives; and redirection of read and write requests to the mapped drives. In one embodiment, Server Message Block (SMB) protocol may be used to map remote server drives.

Similarly, published applications may have access to local printers and network printers. However, the VDA may have access to printers mapped to the server, including local and network printers inaccessible by the client. In one embodiment, VDA printers may be enumerated and mapped to the client, such that the client may direct print traffic via a virtual channel of the remote desktop communications. This embodiment may comprise installing Network Print Provider, Print Service, and Universal Print Drivers (UPD), and mapping VDA printers into the client and redirecting print traffic.

In another embodiment, a Universal Print (UP) Client may be installed on the client machine and a UP Server installed on the VDA. The VDA may provide a list of network printers accessible by the VDA in order to facilitate the network printer discovery at the client. In some embodiments, the UP Server may also be installed on the client. In many embodiments, the client may use the UP Server to print to network printers. Because no local printers are created through this implementation, no administrator privileges are required on the client and no additional printer drivers need be installed.

Additional embodiments of the above discussed methods and systems are included in the appendices immediately following this description. These embodiments are intended to serve as illustrative examples only. One of skill in the art may readily envision similar embodiments that do not depart from the scope of this disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for providing seamless thumbnails for hosted applications, it will now become apparent to one of skill in the art that other embodiments incorporating the concepts of the invention may be used.

Section C: Illustrative Embodiment for Seamless Windows Virtual Channel Protocol The following presents an illustrative embodiment for seamless window integration using a virtual channel protocol. Use of specific limiting language within this Section C should not be imputed to other embodiments described herein. For example, while certain items "must" occur in this embodiment, those items may be optional or merely illustrative in other embodiments described herein.

Seamless Windows Interface (also sometimes known as Transparent Windows Interface or Seamless) is an add-on component for client-side systems, such as the Citrix Receiver for XenApp and XenDesktop manufactured by Citrix Systems, Inc. The seamless virtual channel protocol enhances the client with windows information, making each remote application appear in a separate resizable window on the client device. Users cannot tell the difference between local and remote applications; all of them are presented in the same way. Thus, the user interface is said to be "seamless" between locally and remotely executing applications.

Seamlessness may be especially beneficial in a mixed environment, when users need to use local and remote applications during regular business operation or remote applications hosted on multiple servers at the same time.

When the host agent starts, it sends a TWI_PACKET_START packet with some essential host information (that is, version, desktop resolution).

The client responds with a TWI_PACKET_C2H_START_ACK packet, confirming TWI_PACKET_START and supplying client version/capabilities information. This packet indicates the connection mode the client wants to use, seamless or standard. Based on the host version number and supported seamless protocol version number, the client determines if it is possible to enable seamless mode.

If the client wants to enable seamless connection, it sets the Action field in the TWI_PACKET_C2H_START_ACK packet to zero and sends a TWI_PACKET_C2H_CLIENTINFO/TWI_PACKET_C2H_CLIENTINFOEX packet with some essential client information.

When the client receives the TWI_PACKET_C2H_START_ACK packet and the Action field is set to zero (indicating that the client wants to switch to seamless mode), the host agent sends a TWI_PACKET_OPEN request to indicate the mode switch and a TWI_PACKET_SYSINFO packet with some extra general information (window settings on the host).

When the client receives the TWI_PACKET_OPEN packet, it resets all internal data structures and enables seamless windows processing.

During a seamless connection, the host agent sends windows information; for example, window position, size, styles, and window text, for all the top-level windows on the client device. In addition, foreground window information is sent (that is, the foreground window ID).

In accordance with this information, the client creates windows with the same size/position on the client device. Depending on the connection's server type, the window creation flags are set as indicated below:
    In embodiments using an older server type, all seamless windows are created on the client as frameless and captionless.
    In embodiments using a newer server type, all seamless windows are created with the frame and caption styles. However, the frame and caption sizes are zero, effectively giving the client full control over the window. The caption style flag may be set because of Taskbar System menu compatibility.

To support client-side window handling (move/resize), the client may emulate frame/caption elements by intercepting a WM_NCHITTEST message In many embodiments, the client tries to perform some operations (windows move/resize) locally, sending update information to the host later.

Foreground window changes can happen on both the client and the host, so a set of rules is used to balance foreground window changes.

The Z-order on the client is a superset of the host Z-order (the client always has more windows than the host). The host Z-order is reproduced on the client by reproducing the owner/owned relationship among windows, TOP_MOST flag in the window style, and Foreground Window balancing.

In some embodiments, the system allows a user to switch between seamless and full-screen mode by pressing a hotkey combination, such as Shift+F2, or by using the Connection Center. Note that the full screen mode in this case is not an original full screen mode, but rather a simulation. If the user connection is opened in a standard full screen mode, all graphics output goes directly to the screen. If the user connection is originally opened in seamless mode and then switched to a simulated full screen mode, graphics output goes through a Shadow Bitmap, and is only then copied to the screen.

When the user issues a change mode command (the above mentioned hotkey combination or by using the Connection Center), in some embodiments, the client sends a TWI_PACKET_C2H_PAUSE packet, asking the host agent to suspend operation. If the client is already in a simulated full screen mode, it sends a TWI_PACKET_C2H_RESUME packet, asking the host agent to resume operation.

At logoff, the host agent switches itself to a suspended mode and does not send information to the client. At reconnection, the host agent sends a TWI_PACKET_START packet again, reporting the host agent state as "already running, reconnect."

Focus Balancing

Focus change events can occur on both sides of the wire-on the client and on the host. Therefore, the client and the host agent must use a set of rules to negotiate the focus (foreground window).

For example, in one embodiment with a seamless client and two connected servers, a user may be working in three remote applications—tw on the first server and one on the second server—and one local program running on the client. Five focus transition cases are detailed below:

First, focus goes from the first remote window (first server) to the second remote window (first server) because of the mouse click inside the application window. In this transition, the host agent (first server) detects a foreground window change and reports it to the client. The client changes the local desktop, bringing the appropriate window to the foreground.

Second, the focus goes from the first remote window (first server) to the second remote window (first server) because of a client-originated event; for example, Alt+Tab or a mouse click on a task bar. In this transition, the client receives an operating system notification in the form of WM_KILLFOCUS/WM_SETFOCUS messages and reports it to the host agent (first server). The host agent (first server) changes its local desktop, bringing the appropriate window to the foreground.

Third, focus goes from the first remote window (first server) to the local program. In this transition, the client receives an operating system notification in the form of a WM_KILLFOCUS message and reports it to the host agent (first server). Because the local program does not have a corresponding window on the server, the host agent (first server) sets its own window as a foreground to absorb the focus. To avoid appearance of the host agent window on the client device, this window is created outside the visible desktop area.

Fourth, the focus goes from the local program to the first remote window (first server). In this transition, the client receives an operating system notification in the form of a WM_SETFOCUS message and reports it to the host agent (first server). The host agent (first server) changes its local desktop, bringing the appropriate window to the foreground.

Fifth, the focus goes from the first remote window (first server) to the third remote window (second server). In this transition, there are two instances of the seamless client running on the client device, one per server. Each of these seamless clients is independent of the other and does not know about the other (the top-level control over multiple connections is performed by the Connection Center but it does not involve focus balancing). Both clients treat windows created by the other client as local programs; that is, from the first client point of view, focus goes to the local program; from the second client point of view, focus goes to the third remote application from a local program.

Echo Suppressing and Simultaneous Focus Change Events

The focus change event can be activated on the host and the client simultaneously. For example, the host program will request the focus change and the user will try to change the focus window at the same time. In this case, the focus is set in accordance with the last processed request.

On a low-speed connection, there may be significant delay between the user action and an actual focus change event. In certain circumstances, it might cause focus oscillation or uncontrolled focus oscillation (flipping). The seamless client uses echo suppression to avoid focus oscillation.

After the host agent detects the foreground window change, it always compares the new foreground window with the latest client request. If the focus change event occurs because of the client request, there is no need to report it to the client and the host agent simply ignores the event.

The client employs the same technique—it will always compare the new foreground window ID with the latest host agent request and will not report any host-originated events to the host.

Notification Area Support

On some embodiments of servers, the seamless host agent may create a window of class type Shell_TrayWnd. Applications communicate with this window to use notification area services. This window handles all notification messages and forwards these to the client.

If the client operating system is Win9x/NT4 or a newer version, the client makes use of the local notification area to display, create, or change host notification area icons in response to messages received from the host. Any mouse activity over these Systay icons is forwarded by the client to the host.

If the client operating system is NT3.51 or a newer version, the client creates uniquely identifiable icons for each host notification area icon creation or change request from the host. These icons are created as minimized windows so they appear similar to standard NT3.51 iconic windows.

Process Notifications

The TWI_PACKET_CREATEP and TWI_PACKET_DELETEP packets support notification of in-session process creation and termination. Though at first this might seem better suited for the Control Virtual Channel, the tight coupling of process and window data make it more efficient to do process notification in the Seamless Virtual Channel. In addition, process management functions may also be added in the Control Virtual Channel, and the recipient can reuse the process (and window) information from the Seamless Virtual Channel as needed.

Process Data

The TWI_PACKET_CREATEP packet provides information for session processes, whether or not they own Seamless windows or icons. A Seamless window or icon can identify their process ownership by means of the ProcessID field in the TWI_PACKET_CREATEW_V2 and TWI_PACKET_ICON_V2 packets respectively.

Seamless Desktop

When a remote full-screen desktop is in Seamless mode, then the Seamless virtual channel may be enabled and every window in the remote desktop has a local Seamless window representation, including the Desktop window itself and the Taskbar.

The Seamless Desktop mode is enabled at the client when either the TWIMode or RTWIMode ICA Client Configuration settings are set to On for a published desktop.

By itself the Seamless Desktop mode appears to the user just like a regular (non-Seamless) remote desktop, which has a single local window representation. However, the Seamless Desktop mode serves as a base for multiple features that are built as extensions to it. For example:

1. Client Hosted Apps and Reverse Seamless: Client Hosted Apps are separately negotiated over the Control VC. Reverse Seamless is described in this document.
2. Remote Multi-touch support for Desktops: Additional protocol for Multi-touch support is required, which is not defined yet. But Seamless Desktop mode will allow for granular Multi-touch capabilities and input per Window.
3. Window Monitoring for Desktops: Allows the ICA Client to use the Headless (Simulation) API on every window in the remote desktop.

Reverse Seamless

Client Hosted Apps (CHA) are a type of applications that are run on the remote client machine and are also known as Reverse Seamless (RS) apps.

The rationale behind Reverse Seamless is to achieve 100 percent app compatibility by allowing "problem" apps to run locally and yet be part of the unified desktop experience. This allows the user to seamlessly exploit the power of the client, tackle difficult multimedia use cases, device access issues, special locale requirements, etc.

Reverse Seamless ensures that certain apps that run on a client machine appear integrated into a remote full-screen desktop just like regular apps running in the remote desktop itself. The Reverse Seamless integration covers many different aspects, both visual and functional, e.g., Start Menu and Desktop Shortcuts, Windows, Alt-Tab, Systray, Taskbar, client-to-host and host-to-client FTA and URL redirection, etc. It means "reversing" many of the existing remote desktop presentation technologies.

Reverse Seamless Desktop mode is enabled when the RTWIMode ICA Client Configuration setting is set to On. Reverse Seamless Desktop mode is an extension to Seamless Desktop mode, which is described in the previous section. When the HOST_AGENT_FLAGS_REVERSE_SEAMLESS and TWI_CLIENT_FLAG_REVERSE_SEAMLESS flags are negotiated by the client and the host over the Seamless VC protocol, then the Reverse Seamless commands are supported.

In some embodiments, the host negotiated flag may be used to confirm that the host supports the Reverse Seamless feature. This flag works with TWI_CLIENT_FLAG_REVERSE_SEAMLESS, which is used by the client to tell the host that it supports the Reverse Seamless feature. When both host and client support this capability, Reverse Seamless Desktop mode is enabled and the Reverse Seamless commands are supported.

Whenever the host capability flag is set, the HOST_AGENT_FLAGS_STR_UTF8_CAPABLE flag must also be set. In other words, all strings and multi-strings transmitted by Reverse Seamless protocol commands and corresponding elements are in UTF8.

Similarly, The TWI_CLIENT_FLAG_REVERSE_SEAMLESS flag is used to confirm that the client supports the Reverse Seamless feature. This flag works with HOST_AGENT_FLAGS_REVERSE_SEAMLESS, which is used by the host to tell the client that it supports the Reverse Seamless feature. When both host and client support this capability, Reverse Seamless Desktop mode is enabled and the Reverse Seamless commands are supported.

Whenever this flag is set, the TWI_CLIENT_FLAG_STR_UTF8_CAPABLE flag must also be set. In other words, all strings and multi-strings transmitted by Reverse Seamless protocol commands and corresponding elements are in UTF8.

Reverse Seamless is achieved in some embodiments by mixing the native windows of CHAs with the Seamless windows from the remote Seamless Desktop and manipulating the Z-order. Normally the Seamless window representing the remote Desktop is at the bottom of the Z-order, followed by any combination of native CHA windows and Seamless windows from apps in the remote desktop, including the remote desktop's Taskbar.

The client may run in a multi-monitor scenario where multiple remote desktop connections might be launched, with each remote desktop occupying a subset of all monitors. Each remote desktop launched from the same endpoint is completely isolated from other remote desktops and the local desktop itself. In other words, windows and Systray items of a CHA launched from a specific desktop are only integrated in that desktop.

In some environments local client applications not published as CHAs may also be integrated with one or more remote desktops, e.g., a laptop's battery meter. The exact behavior could be application-specific or policy-controlled.

Seamless Client Structure and Interfaces

Seamless operations associated with a particular remote session, such as window manipulation and focus management, may be implemented inside the Thinwire virtual driver or in a separate seamless virtual driver. All top-level seamless functions dealing with all remote sessions, such as application launch, client desktop settings, monitoring, and seamless user interface (UI) (Connection Center), may be implemented as a part of the client UI (WFCRUN).

In some embodiments, the seamless client may also use a new enhanced inter-process communication (IPC) mechanism for all internal client communication, including seamless operations. Common top-level seamless functions supported by the Connection Center may use the enhanced IPC mechanism to obtain session information, including seamless-specific information and to execute commands including seamless-specific commands.

The Connection Center may also provide an external IPC for communication with other client UI components.

Window Control Messages

In some embodiments, packets may be sent from the host to set a Reverse Seamless window to the foreground. In other embodiments, the host may send packets to the client to set control information related to a Reverse Seamless window, such as to show or hide the window, maximize, minimize or restore the window, or any other similar attributes.

In still other embodiments, packets may be sent from the host in response to a request from the client to specify the status of or return code from processing of a command at the host, such as a system tray interaction. Responses may indicate success, failure, and may include a success or failure code in some embodiments.

In still yet other embodiments, packets may be sent to the client to transmit a system tray message to a reverse seamless or published application. The system tray message may be a result of a shell action on a system tray icon in the host environment. These message may include a unique sequence number to identify the message.

In yet still other embodiments, the host may send packets to the client to configure the client's shell work area. In the case of a multi-monitor environment, multiple work area elements may be supplied, each representing the configuration for a specific monitor.

Similarly, in some embodiments, packets may be sent from the client to create a Reverse Seamless (RS) window stub representation in the host session, integrate it in the host's taskbar, etc. This command may be sent to the host when a Client Hosted App (CHA) creates a new RS window.

In some embodiments, the CHA and RS feature logic at the client uses the Session GUID to distinguish reconnection to the same session vs. connection to a new session. The client may also use the GUID to uniquely identify sessions in scenarios where multiple simultaneous sessions are launched from the same client and, for example, following reconnection to disconnected session, to reintegrate any orphaned CHAs and their RS windows into the respective session.

In other embodiments, packets may be sent from the client to the host to change the attributes of a reverse seamless window in the host session. In still other embodiments, the client may send a packet to the host to destroy a reverse seamless window's stub representation in the host session, remove it from the host's taskbar, etc. Upon disconnect or logoff from the host session, in some embodiments, the reverse seamless window's stub representation in the host session is automatically destroyed without an explicit packet being sent from the client.

In some embodiments, the client may send a packet to the host to notify the host that a reverse seamless window has been set to the foreground. In other embodiments, the client may send a packet to the host as a notification that a new process associated with a CHA has been created at the client. The process may or may not have a RS window associated with it at the time this packet is sent. Multiple processes might be associated with the launch of a single CHA, in which case multiple packets are sent. In some embodiments, the CHA and RS feature logic at the client uses the Session GUID to distinguish reconnection to the same session vs. connection to a new session. The client also uses the GUID to uniquely identify sessions in scenarios where multiple simultaneous sessions are launched from the same client and, for example, following reconnection to a disconnected session, to reintegrate any orphaned CHAs and their RS windows into the respective session. Reintegration is achieved by means of the same create window and create process messages.

In other embodiments, the client may send a packet to the host to notify the host that a process associated with a CHA has been deleted or terminated at the client. In some embodiments, prior to sending such notification, the client may send a request to destroy window stubs associated with each reverse seamless window, if any, associated with the same ProcessID. Upon disconnect or logoff from the session, the CHA's process information in the host session may be automatically deleted without a notification from the client, in many embodiments.

In still other embodiments, the client may send packets to the host to set control information related to a reverse seamless window, such as to show or hide, minimize, maximize or restore a window, etc. In yet still other embodiments, the client may send a packet to the host as a command for a reverse seamless system tray icon. The command may contain shell notification data, and may be uniquely identified by a client generated sequence number or ID. The sequence number may be mirrored in any response from the host. This allows for multiple pending requests, and asynchronous or out-of-order responses. Notifications may include balloon icons, icon bitmaps, status messages, interactions with an icon or message, or other information. In some embodiments, a notification message may be sent when a mouse event or hover occurs in the bounding rectangle of a reverse seamless system tray icon in the host session, when a reverse seamless icon is selected or activated with the keyboard, or when those actions occur in a balloon notification.

Section D: Reverse Seamless Functionality Description

Core Reverse Seamless Functionality

In some embodiments, on clicking a Reverse Seamless Application shortcut in the virtual desktop, remote desktop, or virtual desktop appliance (referred to generally as a VDA) session start menu, the application may run from the client device but will display within the VDA session as if running inside the session.

The Reverse Seamless application window can be positioned above, below, or in-between the remote windows on the VDA. In many embodiments, the Reverse Seamless application window follows the same rules as the remote windows on the VDA. In some embodiments, the Reverse Seamless application can also be launched using a command line from the VDA session.

Shortcuts of the published Reverse Seamless applications may be placed in the user start menu in the VDA session. Icons from the actual applications may be used for the shortcut icons. If the published Reverse Seamless applications are not available from the client, they may be indicated as not available using visual methods, such as graying out the icon, drawing an X through the icon, or other methods.

Application/VDA Association

In some embodiments, the following windows are integrated into the VDA session:

1. Windows from a Reverse Seamless application process that was launched from that VDA.
2. Windows from a Reverse Seamless application process that was launched via FTA from the VDA.
3. Any windows belonging to the child process of the processes from either #1 or #2.

Any other local windows may remain on the client local desktop. This includes special windows from user interfaces related to the client agent or session receiver application, as long as the local windows are not set to always-on-top.

RS Window Minimize and Maximize Behavior

In some embodiments, minimizing the Reverse Seamless Application window will minimize it to the taskbar in the VDA session, if applicable. Clicking on the taskbar entry should restore the window.

Similarly, maximizing the Reverse Seamless Application window will maximize it in the VDA session, covering the appropriate available work area. It should be maximized to the correct monitor just like any other remote windows in the session.

Taskbar Integration

In some embodiments, multiple instances of the Reverse Seamless Application will abide by the Taskbar settings of the VDI desktop. That is, application grouping, ordering, and other features should function the same way for the Reverse Seamless Application as it does for the local applications within the VDA Session. However, in many embodiments, specific rules may be applied to grouping of windows, described below.

1. RS-with-RS App Windows. RS-with-VDA Hosted App Windows

In some embodiments, windows from the same RS application process may be grouped in a single Taskbar entry, but even though it is desired, it is not strictly expected to group RS windows with the remote windows from the corresponding app on the VDA. This may include grouping of RS app windows with pinned shortcuts to VDA Hosted apps on a Microsoft Windows 7 VDA Taskbar.

2. Pinned Shortcuts to RS Published Apps

In some embodiments, RS Published Apps may be available in the VDA's Start Menu and will also be pinnable on a Windows 7 VDA Taskbar. In some embodiments, pinned shortcuts to RS Published Apps may be grouped with the running instances of RS App Windows, or VDA hosted apps, or pinned shortcuts to VDA Hosted apps.

3. Pinning of RS App Windows to Win? VDA Taskbar.

In some embodiments, pinning of RS Application Windows may not be allowed within the VDA taskbar. In these embodiments, the default Taskbar Tasks for a RS App Window on a Windows 7 VDA may be limited to just a "Close window" task. In other embodiments, during grouping with VDA Hosted App Windows, the Destination List of the VDA Hosted app will be reused and any actions on it will apply only to the VDA app.

URL Redirection

In some embodiments, URLs may be redirected both client-to-VDA and VDA-to-client subject to policy configurations for both. The Reverse Seamless application may redirect web contents to the applications installed in the VDA session. For example, if a media player application, running as a Reverse Seamless application, displays a URL link, clicking the link may launch the web browser installed within the VDA Session.

In some embodiments, when the URL gets redirected, the target for the URL launch may honor default browser settings (i.e. which web browser of a plurality of installed web browsers is to be used by default).

The policies will be implemented by URL matching. The following lists will be created to direct the redirection behaviors:

1. A white list on the client side: Only the listed URLs are handled by the Reverse Seamless browser from the client. Any other web content will be redirected to the browser within the VDA.
2. A black list on the VDA side: The listed URLs are sent to the Reverse Seamless browser and handled from the client side. Any other web content will be processed within the VDA session.

The policies may also include flexible pattern matching to allow for wildcards; support for FTP URLs; or other features. In some embodiments, redirection may include URL redirection within a browser or a web-based app. In a further embodiment, systems for this internal redirection may include Browser Helper Objects, while in another further embodiment, internal redirection may include lower-level interception of WinHTTP calls.

In some embodiments, upon error, such as a 404 error from a web browser, the redirection may include fallback functionality to allow the source browser to attempt to access the URL. This may succeed because of different network accessibility, or may result in a potentially more meaningful error message to the end user as compared to straight denial of service. This fallback may happen as follows:

a. Client: URL is in white list but local client launch fails. Fall-back to VDA launch over presentation protocol. URL is not in white list but launch on VDA over presentation protocol fails. Fallback to local client launch.
b. VDA: URL is not in blacklist but launch on VDA fails. Fall-back to local client launch over presentation protocol. URL is in black list but local client launch over presentation protocol fails. Fall-back to VDA launch.

File Open/Save Dialog Behavior

In some embodiments, Save/Save As and Open dialogs from the Reverse Seamless application may default to the local client's File System to enable access to the local content, or any other default location the administrator might have configured, e.g., a network share, which is also accessible by VDA-hosted apps.

Reverse FTA

In some embodiments, Reverse Seamless applications may be accessible via File Type Associations inside the VDA session. In these embodiments, one or more client file type associations are modified to point to the VDA. Arbitration and association then occurs at the VDA. In the VDA, FTA priority for arbitration is as follows:

1) Reverse Seamless FTA
   a. FTAs that are explicitly published by the admin as part of publishing the reverse seamless app.
   b. FTAs retrieved from the client. Only FTAs associated with a reverse seamless published app will be retrieved. These client FTAs are only retrieved and used if (1a) is not published explicitly by the admin.
2) FTAs natively present in the VDA. This could include FTAs provisioned by the Online Plugin in a double hop scenario or FTAs for apps that are locally installed in the app.

In some embodiments, FTAs present in the client that are not associated with a reverse seamless app will not be transmitted and mapped in the VDA. In many embodiments, PTA-launched Reverse Seamless applications will be associated with VDA session from which they are launched.

Cookie and Token Redirection

In some embodiments, cookies, tokens, etc. from the VDA/user profile may be provided to the Reverse Seamless application. For Web/HTTP Cookies, in some embodiments, they will be redirected from VDA to the client only, not in the other direction. In other embodiments, cookies and tokens may be provided client-to-host or bi-directionally.

Client Process Control

In some embodiments, the VDA has the capability to monitor Reverse Seamless application processes. A user or administrator can terminate these processes in the events of failures or hangs, from the VDA.

In one embodiment, a desktop viewer control application may provide a user interface for controlling and monitoring processes. In other embodiments, the VDA hosts a user interface, launchable via an icon in the system tray, a start menu item, or other means. Reverse seamless applications are enumerated over a virtual channel and represented in the VDA-hosted UI for remote management. In some embodiments, stub processes in the VDA may be created to represent each reverse seamless application, and these processes may be integrated within the VDA's native task manager.

System Tray Integration

In some embodiments, if the Reverse Seamless application makes use of the system tray, the application icon or other element may be integrated into the system tray on the VDA. In some embodiments, Reverse Seamless applications and potential child processes may be integrated into the VDA system tray. Others may not be integrated, based on a policy. For example, in some embodiments, the local client Battery Meter may not be propagated to the VDA's Systray, to avoid confusion to the user, who may think the VDA's battery is low. However, such policies may be configurable based on user or administrator requirements. Similarly, other UI elements that make use of the system tray, such as tooltips and balloons, may also be integrated as well.

Cut & Paste

In some embodiments, Cut/Paste functions between the Reverse Seamless application and those within the VDA Session may be integrated through a shared or copied clipboard or clipboard virtual channel, responsive to security or configuration policies.

Print Screen

In some embodiments, the system may include functionality for capturing screen images, such as the Print Screen function provided by various versions of the Windows operating system provided by Microsoft, Inc. These captured images may include images from the Reverse Seamless application and its content, via the following functions:

1. RS App Windows and VDA Desktop

A Print Screen function performed within the VDA Session may capture the Reverse Seamless application window and its contents if it is performed by the end user, e.g., using the local client keyboard. This applies to both Print Screen and Alt Print Screen (on a specific window).

However, if a VDA hosted app uses an API to scrape the screen contents, it will not be aware of the existence of the RS app window, and will not be able to retrieve it: It will only retrieve the contents of the VDA's desktop and all VDA-hosted apps. This allows additional security for published applications.

2. Alt Print Screen on VDA Hosted Windows

The client may use a keyboard hook to redirect an event to the respective host window. Responsive to the redirected event, contents may be retrievable over the Clipboard virtual channel.

Quick Launch/Desktop Integration

In some embodiments, shortcuts to the Reverse Seamless applications in the start menu can be copied to the desktop on the VDA. In other embodiments, the shortcut can also be moved to the Taskbar quick launch area. In still other embodiments, the shortcut may be "pinnable" on the Taskbar.

RS App Publishing

In some embodiments, a user interface may be provided in an administrator console to centrally create and manage Reverse Seamless applications for VDAs. In other embodiments, a command line with optional parameters to the Reverse Seamless application, and optionally its working directory may be used to publish the application. Environment variables can be used in the command line and working directory. The environment variables will be evaluated from the client that launches the Reverse Seamless application. In many embodiments, the command line may support any number of arbitrary parameters. In other embodiments, command-lets, for example PowerShell command-lets, manufactured by Citrix Systems, Inc., may be used to centrally create and manage Reverse Seamless applications.

In one embodiment, icons and FTAs may be preconfigured at publishing time. Icons and FTAs may be selected or retrieved from the client machine if the Administrator Console is run on the client or has direct access to it. Otherwise, a default icon and FTAs may be set. In another embodiment, RS application icons and FTAs may be retrieved from the client at runtime and populated to the start menu of the VDA.

Disconnection and Logoff

In some embodiments, on a user-triggered VDA disconnect, the Reverse Seamless windows may remain open on the client as local windows. However, reconnection to the session could happen from the same or different client, and the RS apps might have to be closed in the meantime, or unavailable (if a new client), and the reconnect might have quickly happed over ACR. Accordingly, in some embodiments, the client and host may not remap reverse seamless windows on reconnection. In other embodiments, the client and host may remap windows silently. In still other embodiments, the client and host may present a user interface to the user to allow them to select which applications should be remapped or relaunched.

Similarly, if the VDA logoffs or shuts down, existing Reverse Seamless windows may also be closed and the process exited gracefully.

VDA Windowed Mode

In some embodiments, when the VDA goes into windowed mode, Reverse

Seamless application windows may be minimized and removed from the VDA. The Taskbar entries may stay on the VDA Taskbar, and the Taskbar buttons may keep the default behaviors. When the VDA goes back into full screen mode, the Reverse Seamless applications may be restored and normal operations resumed.

In one embodiment, if the user attempts to move a Reverse Seamless window off the full screen VDA session boundary into a different monitor, the client will make an attempt to stop the movement. This behavior may be made configurable according to a user-set policy.

Scaling

In some embodiments, if Desktop Viewer is used and scaling is enabled, the maximized Reverse Seamless application windows could be made to match the VDA resolution.

Section E: Interface Configuration Details

In some embodiments, the systems and methods described herein provide support for applications that are installed on the client device running on the published desktop in a so-called reverse seamless mode, when the user cannot differentiate an application installed on the desktop that he is using from the application launched from his own client PC. Such an application is always running on the ICA client machine, but ICA displays its window on the VDA in a seamless fashion including integration in the taskbar and Alt+Tab switches. These applications may be referred to as Reverse Seamless Applications or RS Apps.

In many embodiments, RS apps may be published by the administrator via a console UI or software development kit (SDK), similar to desktop hosted application publishing. In some embodiments, the console UI and SDK will allow specifying file type associations (FTAs) for RS Apps without importing FTA data from the client device.

In one embodiment, the server may receive a list of RS apps at the session preparation stage and may create shortcuts to these apps in the start menu of the remote desktop. In some embodiments, to support RS apps in reconnection to a disconnected session, either from the same or a different client, the server may maintain an index of what applications were running before the disconnect, and will attempt to re-launch them on the reconnecting client.

In some embodiments, regular hosted applications may be differentiated from reverse seamless applications via an attribute of the application object. The attribute may identify the application as hosted on a desktop, reverse seamless, hosted on a terminal server, streamed, or any similar identifier.

In some embodiments, during Client-to-Host launches the host may perform special security validation on the published applications and the parameters passed to them, if any. Similarly, in other embodiments, the host may validate both the RS (client-hosted) published apps and the parameters passed to them, if any, during Host-to-Client launches. In one embodiment, an administrator may publish a RS (client-hosted) app with optional parameters. Full validation will be done by the host by default: Requests to launch an app that is not published may be rejected, responsive to a security policy. In some embodiments, requests to launch an application with parameters that are outside the pattern defined during publishing will be rejected by default.

In some embodiments, an RS app may be available in the Start Menu of the remote VDA. The command line of the VDA session may also support scripting of RS applications. In these embodiments, a script may activate a RS Launcher Agent and send the request to the client, similar to a short-cut on the start menu.

In some embodiments, parameter validation may be disabled to avoid restricting the scripts configured by the customer. In a further embodiment, disabling the parameter validation may only affect validation of the parameters and not of the published app itself. Published apps themselves will thus always be validated before sending a launch request to the client.

In some embodiments, due to security considerations it may be undesirable to import a set of file type associations from the client machines. In such cases, the console UI or SDK may provide a way to associate a file extension with an RS application in a free form. Accordingly, file type associations may be registered in some embodiments based on default FTAs, while in other embodiments, the associations may be registered by providing information about the extension from the command line. These two behaviors can be implemented by two distinct parameter sets and are applicable to both desktop hosted and reverse seamless applications.

In some embodiments, RS apps appear in the start menu on the remote desktop as soon as the user logs in. Similarly, the remote desktop should have FTA for RS apps written to the registry, so that a content launch would call an RS app. To accomplish these, in some embodiments, a client agent may retrieve a list of applications and FTAs associated with each app from a published application broker when a new session is created. This information may be provided to the host during the session preparation stage. In some embodiments, once the broker sends a list of applications to an agent of the host or client, these applications may be stored in an in-memory cache of the host or client agent while the session is being established.

Section F: Control Channel Virtual Channel Protocol

In some embodiments, communications from a client to host and vice versa may be passed via a control virtual channel of an established remote desktop session. The virtual channel may be implemented, in some embodiments, as a virtual driver, or by using a user-context agent and/or virtual channel interface via a helper DLL. These communications may include session events, which are commands that notify the host or client of session state, including lock, disconnect, logoff, or other states, or a globally unique session ID provided from the host to the client. In some embodiments, the host may send session events immediately after capability negotiation or at any time afterwards.

In some embodiments, session event notifications may include binding request messages. These may be sent if the host has capability for processing session events. In other embodiments, control communications may include binding response messages. These may be sent if the client has capability for processing session events and has received a binding request message. Similarly, in other embodiments, control communications may include a binding commit command, if the host has capability for processing session events and the client has transmitted a binding request. Capability for processing session events may thus be negotiated independently from other capabilities of the client and host, allowing use of these features independently.

Similarly, in many embodiments, communications may include notifications of capability for executing client hosted applications and processing commands related to client hosted applications. Client hosted applications (CHA) are applications that are run on the remote client machine. These are sometimes referred to as Reverse Seamless (RS) applications.

The rationale behind Reverse Seamless applications is to achieve 100 percent application compatibility in remote presentation systems by allowing "problem" applications to run locally and yet be part of the unified desktop experience. This allows the user to seamlessly exploit the power of the client, tackle difficult multimedia use cases, device access issues, special locale requirements, etc.

Reverse Seamless ensures that certain apps that run on a client machine appear integrated into a remote full-screen desktop just like regular apps running in the remote desktop itself. The Reverse Seamless integration covers many different aspects, both visual and functional, e.g., Start Menu and Desktop Shortcuts, Windows, Alt-Tab, Systray, Taskbar, client-to-host and host-to-client FTA and URL redirection, etc.

Commands sent between the client and host via the control virtual channel may be used, in some embodiments, to notify the other device about capabilities for executing client hosted applications; enumerating applications available at the client environment; validating the availability of applications available at the client environment; requesting and transmitting enumeration of application attributes such as icons or file type associations from the client, or other information.

Responses to these requests, in some embodiments, may include one or more attributes of an application, including an application ID. This may be sent to allow the client and host to communicate with regard to a plurality of applications asynchronously, with potentially out-of-order responses, without ambiguity or confusion. In other embodiments, sequence IDs may be used for the same purpose. In one embodiment, the host may send positive sequence IDs to denote a host-initiated request, and the client may send negative sequence IDs to denote a client-initiated request. Sequence IDs may be unique, although in many embodiments, they may be reused after processing the response to a request is complete.

In some embodiments, the responses may also include an icon of the application. In one embodiment, multiple icons in different sizes may be sent from the client to the host, allowing scaling on the host as necessary. In some embodiments, default icons may be used for applications.

Commands sent via the virtual command channel may also include, in some embodiments, commands to request the launch of a CHA or a resource such as a URL. The host may, in these embodiments, send these commands immediately after capability negotiation, or at any time afterwards. The commands to request the launch of a CHA may comprise a direct launch request, which may occur when a user clicks on a CHA shortcut in the host's start menu, desktop, or other interface element, or when an explicit launch is triggered on a command line in the host session. In other embodiments, the commands to request the launch of a CHA may comprise a file type association launch, such as where a user has clicked on a document via the virtual or remote desktop environment supplied by the host. In still other embodiments, the commands to request the launch of a CHA may comprise a URL, such as where a user has clicked on a URL listed in an email or other document viewed on a program executed by the host and displayed at the client via a presentation protocol.

File type associations may also be looped back to the client via the control virtual channel, such as when a user interacts with one CHA and launches embedded content associated with another CHA. For example, opening a .doc attachment in a CHA copy of Microsoft Outlook may launch a CHA copy of Microsoft Word. The file type association may still be arbitrated by the host. Accordingly, in these embodiments, the client may send a request to the host with the file type. The host may respond with a launch response targeting the associated application. The host may further send a launch request, mirroring the launch request from the client with the file type resolved to the associated application. The client may then launch the application and document, and respond to the host with a status code. In some embodiments, failure of the client to respond with a status code may be interpreted as failure, after the expiration of a time-out timer.

Client Hosted Apps Request/Response Sequence Numbers

In some embodiments, a ICACC_CHA_APP_LAUNCH_REQUEST_DATA structure may be shared between host and client app and URL launch requests. The SequenceNumber field of the ICACC_CHA_APP_LAUNCH_REQUEST_DATA structure specifies the request sequence number, discussed above. In some embodiments, when the host generates the request, SequenceNumber must be a positive value and when the client generates the request, SequenceNumber must be a negative value. However, during a loopback launch, as discussed above, the host mirrors in its launch request the original client-generated sequence number, which is negative. In many embodiments, sequence numbers must be unique but could be reused after processing the response to a request is complete. The same sequence number is mirrored in the response. In case of multiple requests, the sequence number allows the receiver (client or host) to send asynchronous and potentially out-of-order responses.

Client Hosted Apps FTA Resolution

In some embodiments, the FTAs for some CHAs are admin-configured. The FTAs for the rest of the CHAs are client-enumerated. The host owns the process of resolving FTAs:

CHAs have precedence over host apps.

For CHA FTAs, if an admin-configured or client-enumerated FTA applies to more than one CHA, precedence is given to the CHA whose FTA is admin-configured.

If the administrator has mistakenly configured the same FTA for more than one CHA, then the first CHA in enumeration order that has the FTA is chosen.

The client guarantees that client-enumerated FTAs are unique, which is what happens by default on a Windows OS client system. This is true unless FTAs are reassigned in the client environment during the CHA enumeration process, e.g., if a CHA is being installed in the meantime. This is a rare race condition and if it does occur, precedence is given to the first CHA in enumeration order that has the FTA.

Session GUIDs

In many embodiments, a globally unique identifier may be used to identify each remote host session. A new GUID may be generated for each new remote host session and can be persisted between session disconnects/reconnects. In such embodiments, the CHA feature logic at the client uses the session GUID to distinguish reconnection to the same session vs. connection to a new session. The CHA feature also uses the GUID to uniquely identify sessions in scenarios where multiple simultaneous sessions are launched from the same client and, for example, following reconnection to disconnected session, to reintegrate any orphaned CHAs into the respective session.

URL Redirection White Lists and Black Lists

URL redirection white list policies may be communicated via the virtual command channel from the remote host to the client. In one embodiment, the URL White List is a multi-string of URLs, which specify the URLs that the client is allowed to launch in its local environment. The list may contain complete URLs or wild cards. Any URL that does not match the URL White List may be redirected for launching at the host.

Similarly, in these embodiments, the host may have a separate URL Black List, which specifies URLs that are not allowed to launch at the host and are redirected for launching at the client. The URL Black List is host-side only and is not communicated to the client. However, the host adds from the Black List to the White List any entry that is not already in the White List. Thus the host ensures that the URL White List sent to the client is always a superset of the URL Black List, i.e., either the same or bigger. This is done to prevent infinite loops in redirection.

In many embodiments, the URL White and Black lists are the same but the URL White List could also be a proper superset (bigger), in order to include URLs that are allowed to be launched at both client and host, i.e., there is no need for redirection. In some embodiments, the client uses a White List and the host uses a Black List in order to minimize configuration, since most URLs are preferred to launch at the host. In many embodiments, black lists and white lists may include wild cards for pattern or string matching in URLs.

Section G: Transparent User Interface Integration Virtual Channel

Overview

In some remote desktop systems, the client may repeatedly display its logon status indicator dialog boxes (also referred to as dialogs) on the host server's desktop (such as a XenApp host server, manufactured by Citrix Systems, Inc.). These are presented on the client as topmost windows. While the logon status indicator dialogs don't steal focus they do stay on top of all windows and need to be dragged out of the way if the user wants to continue interacting with the window that has the focus while the connection establishment is in progress. There are two logon status indicator dialogs that are presented. The first logon status indicator dialog is presented by the client. The second logon status indicator dialog is presented by the server during the establishment of the connection. The client logon status indicator dialog is closed when the server dialog is displayed so to the user it looks as if it is a single logon status indicator dialog.

Accordingly, a more pleasant user experience may be provided when presenting the logon status indicator dialog by using a single dialog on the client to present all logon status indicator messages regardless if they originate from the client or server. The new scheme will present a dialog that is not a topmost window so that it may be covered without having to drag it out of the way and which is rendered on the client.

Figure 5:
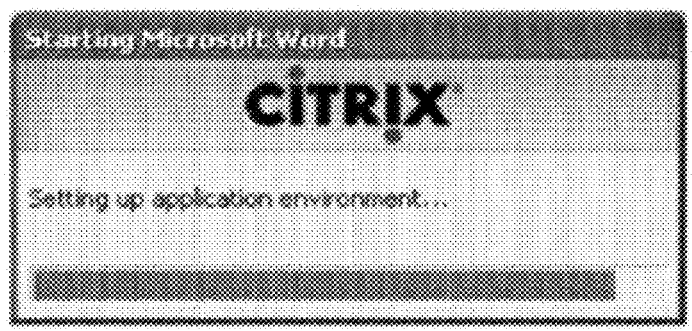
FIG. 5 illustrates a legacy logon status indicator dialog (host-generated and host-rendered).

In some embodiments, the enhanced logon status indicator experience is displayed to the user regardless of whether a client receiver component is or is not running. When the component is not present, the indicator still provides a consistent launch experience that resembles the ideal dialog as closely as possible. To accomplish this goal, in some embodiments, the component function that is used to present the logon status indicator dialog may be provided in a library so that the client calls this function directly when the component is not running so that the same code can display the dialog in either circumstance. The function may be provided as part of a common library, or DLL. FIG. 5 illustrates a legacy logon status indicator dialog (host-generated and host-rendered).

Figure 6:
FIG. 6 illustrates a logon status indicator dialog (host-generated but client-rendered) according to an illustrative embodiment.

FIG. 6 illustrates a logon status indicator dialog (host-generated but client-rendered) according to an illustrative embodiment.

The visual appearance for the logon status indicators is a dialog box, which indicates that the connection is being established. In some embodiments, this dialog box should only be displayed if the connection takes over 4 seconds to connect. If the user wants more detail as to what the current status is in regards to establishing the connection they may click on a "More Information" button. The logon status indicator dialog also contains a "Cancel" button that is available to the user when they are allowed to cancel the connection. At some point during the connection process the user is not allowed to cancel the connection and must wait for it to complete. The user interface behavior, which includes the visual appearance as well as the 4 second time out and "More information" functionality, is defined by the logon status indicator display mechanism.

Virtual Channel Purpose

In order to perform the work of the wire data transmission needed to implement the requirements of the Status Indicators Channel, a new Virtual Channel will be created to pass text messages and other UI component metadata (not bitmaps) between client and host. As mentioned previously, the virtual channel used will be the Transparent User Interface Integration virtual channel. The first use of this channel will be for logon status indicator messages from the host to the client. While any text message may be sent over the new virtual channel, the changes associated with this specification only pertain to logon status indicator messages. Any other messages generated on the server outside of logon status indicator messages will not be sent to the client to be rendered locally and will continue to be rendered on the server. Logon status indicator messages are specifically those messages that are displayed when the connection is being established between the client and host. Examples of messages that are not considered logon status indicator messages include license annoyance messages, licensing error messages, and Windows logon prompts.

Client Availability

For a client to receive logon status indicator messages it must load the Virtual Channel driver. If the client loads the Status Indicator Channel the server will open the channel and attempt to send all logon status indicator messages to the client with the expectation that the client will display the messages to the user. The server will not display any logon status indicator messages if it succeeds in opening the VC. If the client does not load the Status Indicator Channel the server may continue to present the logon status indicator messages in a non-integrated method.

Performance

In order to address any potential impact to performance, in some embodiments, the logon status indicator messages may be sent over the new virtual channel asynchronously. This means that the server will not know if the client does not receive a message. It also has the potential that the connection can become fully established before all of the logon status indicator messages have been displayed on the client.

Localization

In many embodiments, the logon status indicator dialogs are rendered on the client computer using the language that the client has been configured through the OS to display. The protocol allows for a message ID for the caption and title to be sent from the server to the client so that the client can retrieve the message locally. The protocol also allows for the caption and title text to be sent from the host to the client. This text is used by the client only if the client cannot locate the message locally using the message ID. If the client displays the caption and/or title using the text that was sent from the server this text will be in the local language as defined on the server and may not be the same language as what is being used on the client machine.

Shadowing

In the case of shadowing by an administrator or other user, or when a first user can view a second user's remote session, in most cases a user will not be shadowed until they have completed logon. If shadowing does occur before the logon is complete the shadowee will not see any logon status indicator messages presented directly on the client. In some embodiments, the prompt asking the user if it is okay for them to be shadowed will not be generated locally and will continue to be displayed through the server.

Pass Thru

Pass-thru sessions may refer to instances where a user of a first computing device views a remote session of a second computing device, itself viewing a remote session of a third computing device. Indicators may be passed from the third device through the second device for generation and display at the first device. In some embodiments, logon status indicators will be displayed in the session making a pass-through connection. Side effects include the rendering of a systray icon by the host session of the pass-through session. In other words, in a pass-through session, the logon status indicators rendered on Server1 while connecting to Server2 will continue to be rendered on Server1 and remoted to the original client.

Mode Switching

In some embodiments, if a user changes modes between windowed and full screen, messages will continue to be displayed in the manner that they were when the original state was established. So, for example if the session was in full screen to start with, messages will be displayed by the server (not through Citrix Receiver). If the user switched to windowed the messages will continue to be displayed by the server. The opposite is true if the user starts off in windowed mode. The messages are displayed through Citrix Receiver if Citrix Receiver is running. If the user switched to full screen the messages will continue to be displayed through Citrix Receiver locally on the client and therefore will not be seen by the user.

In some embodiments, the Status Indicator Channel may provide a conduit for data associated with dialogs and message boxes. This supports presenting both client and host-generated logon status indicator messages in a unified fashion directly on the client.

This feature may be used to provide a standardized channel as a conduit for host status and progress messages. This allows unification of the look and feel of host messages.

In some embodiments, Status Indicator Channel messaging may be more efficient and reduce bandwidth requirements for host-client communications by replacing multiple dialog bitmaps with a few strings and integers.

Transactions

Handshake: The client-to-host (C2H) structure of the virtual channel (VC) may be delivered as part of a basic 3-way handshake.

Virtual Channel (VC) Negotiation: The VC Capability negotiation is going to use a 3-way handshake. The host-to-client (H2C) request and C2H response result in one host-client synchronous roundtrip. The H2C commit may be asynchronous.

Message Delivery: In many embodiments, the Status Indicator Channel may use the Transparent User Interface Integration VC's asynchronous protocol mode.

Since the logon status indicator messages are delivered asynchronously, e.g., queued up and delivered on a separate thread, then overall logon speed will not be affected in any measureable way. The only adverse effect may be that the first only host status indicator message will be delivered to the ICA Client with an extra delay of up to 2 host-client roundtrips. This depends on when the message is generated relative to loading of the host-side status indicator UI renderer module and its ability to initiate VC communication. There should be no delay in displaying any subsequent status indicator messages. However, a potential delay in the first message could cause it to be short-lived, i.e., immediately clobbered by the next message. Accordingly, in some embodiments, the messages may be delivered synchronously. In this case, logon speed will be adversely affected by 2 host-client roundtrips (The exact time will depend on the connection latency).

Smart Auditor

In some embodiments, SmartAuditor functionality may allow for the recording and playback of remote desktop sessions. These embodiments may include capturing the updating display of the client, which means that status dialogs delivered via Status Indicator Channel messaging will not be recorded by SmartAuditor. In one embodiment, to provide recording capability, logon status indicator messaging may be disabled when Smart Auditing is enabled. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    establishing a connection between a client device and a remote host, said remote host providing access to one or more applications executing remotely within a virtual machine executing on the remote host;
    receiving, at the client device, first information from the remote host about a first application executing within the virtual machine executing on the remote host; and
    rendering, within a user interface associated with the client device and with a graphical appearance based on at least one user interface component of said user interface associated with the client device, a first user interface component based on a corresponding user interface component of the first application executing within the virtual machine executing on the remote host.

2. The method of claim 1, wherein the first user interface component comprises an application window rendered directly within the user interface associated with the client device without an intervening application window associated with the remote host.

3. The method of claim 1, further comprising hiding a corresponding user interface element generated by the remote host, and rendering the locally generated first user interface component in its place.

4. The method of claim 1, wherein the first user interface component comprises an icon specific to the first application, and said method further comprises rendering said icon in the user interface associated with the client device.

5. The method of claim 1, wherein the remote host has a first plurality of user interface components, and the client device has a second plurality of user interface components, each of the first plurality of user interface components corresponding to a different one of the second plurality of user interface components, said method further comprising:
    substituting, by the client device, one of the second plurality of user interface components for a corresponding one of the first plurality of user interface components received from the remote host; and
    sending user input to the remote host responsive to the corresponding one of the first plurality of user interface components based on user input received via the corresponding one of the second plurality of user interface components.

6. The method of claim 5, wherein substituting the one of the second plurality of user interface components comprises altering a language of content within the corresponding one of the first plurality of user interface components to a language associated with the client device.

7. The method of claim 5, wherein the first user interface component comprises status information about the first application, said status information intended for presentation in a dialog box, and said method further comprises intercepting the status information and presenting the status information in a dialog box rendered in a style of the user interface associated with the client device.

8. The method of claim 7, wherein said status information comprises login status information, and said rendering comprises redirecting text comprising the login status information to a dialog box originating from the user interface associated with the client device.

9. One or more non-transitory computer readable media comprising computer-readable instructions that, when executed by one or more computers, cause the one or more computers to:
    establish a connection between a client device and a remote host, said remote host providing access to one or more applications executing remotely within a virtual machine executing on the remote host;
    receive, at the client device, first information from the remote host about a first application executing within the virtual machine executing on the remote host; and
    render, within a user interface associated with the client device and with a graphical appearance based on at least one user interface component of said user interface associated with the client device, a first user interface component based on a corresponding user interface component of the first application executing within the virtual machine executing on the remote host.

10. The one or more non-transitory computer-readable media of claim 9, wherein the first user interface component comprises an application window rendered directly within the user interface associated with the client device without an intervening application window associated with the remote host.

11. The one or more non-transitory computer-readable media of claim 9, wherein said instructions, when executed by the one or more computers, further cause the one or more computers to hide a corresponding user interface element generated by the remote host, and to render the locally generated first user interface component in its place.

12. The one or more non-transitory computer-readable media of claim 9, wherein the first user interface component comprises an icon specific to the first application, and wherein said instructions, when executed by the one or more computers, further cause the one or more computers to render said icon in the user interface associated with the client device.

13. The one or more non-transitory computer-readable media of claim 9, wherein the remote host has a first plurality of user interface components, and the client device has a second plurality of user interface components, each of the first plurality of user interface components corresponding to a different one of the second plurality of user interface components, and wherein said instructions, when executed by the one or more computers, further cause the one or more computers to:

substitute, by the client device, one of the second plurality of user interface components for a corresponding one of the first plurality of user interface components received from the remote host; and send user input to the remote host responsive to the corresponding one of the first plurality of user interface components based on user input received via the corresponding one of the second plurality of user interface components.

14. The one or more non-transitory computer-readable media of claim 13, wherein said instructions, when executed by the one or more computers, cause the one or more computers to alter a language of content within the corresponding one of the first plurality of user interface components to a language associated with the client device.

15. The one or more non-transitory computer-readable media of claim 13, wherein the first user interface component comprises status information about the first application, said status information intended for presentation in a dialog box, and wherein said instructions, when executed by the one or more computers, further cause the one or more computers to intercept the status information and present the status information in a dialog box rendered in a style of the user interface associated with the client device.

16. The one or more non-transitory computer-readable media of claim 15, wherein said status information comprises login status information, and wherein said instructions, when executed by the one or more computers, cause the one or more computers to redirect text comprising the login status information to a dialog box originating from the user interface associated with the client device.

17. A client device, comprising:
at least one processor; and
memory storing computer readable instructions that, when executed by the at least one processor, configure the client device to:
establish a connection between the client device and a remote host, said remote host providing access to one or more applications executing remotely within a virtual machine executing on the remote host;
receive, at the client device, first information from the remote host about a first application executing within the virtual machine executing on the remote host; and
render, within a user interface associated with the client device and with a graphical appearance based on at least one user interface component of said user interface associated with the client device, a first user interface component based on a corresponding user interface component of the first application executing within the virtual machine executing on the remote host.

18. The client device of claim 17, wherein the first user interface component comprises an application window rendered directly within the user interface associated with the client device without an intervening application window associated with the remote host.

19. The client device of claim 17, wherein the instructions, when executed by the at least one processor, configure the client device to hide a corresponding user interface element generated by the remote host, and render the locally generated first user interface component in its place.

20. The client device of claim 17, wherein the first user interface component comprises an icon specific to the first application, and wherein the instructions, when executed by the at least one processor, configure the client device to render said icon in the user interface associated with the client device.

21. The client device of claim 17, wherein the remote host has a first plurality of user interface components, and the client device has a second plurality of user interface components, each of the first plurality of user interface components corresponding to a different one of the second plurality of user interface components, and wherein the instructions, when executed by the at least one processor, configure the client device to:

substitute one of the second plurality of user interface components for a corresponding one of the first plurality of user interface components received from the remote host; and send user input to the remote host responsive to the corresponding one of the first plurality of user interface components based on user input received via the corresponding one of the second plurality of user interface components.

22. The client device of claim 21, wherein the instructions, when executed by the at least one processor, configure the client device to alter a language of content within the corresponding one of the first plurality of user interface components to a language associated with the client device.

23. The client device of claim 21, wherein the first user interface component comprises status information about the first application, said status information intended for presentation in a dialog box, and wherein the instructions, when executed by the at least one processor, configure the client device to intercept the status information and present the status information in a dialog box rendered in a style of the user interface associated with the client device.

24. The client device of claim 23, wherein said status information comprises login status information, and wherein the instructions, when executed by the at least one processor, configure the client device to redirect text comprising the login status information to a dialog box originating from the user interface associated with the client device.

* * * * *